US008135256B2

(12) United States Patent
Solheid et al.

(10) Patent No.: US 8,135,256 B2
(45) Date of Patent: Mar. 13, 2012

(54) NETWORK INTERFACE DEVICE

(75) Inventors: James J. Solheid, Lakeville, MN (US); Trevor D. Smith, Eden Prairie, MN (US); Cindy S. Walters, Prior Lake, MN (US); Oscar Fernando Bran de Leon, Belle Plaine, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 1502 days.

(21) Appl. No.: 11/607,676

(22) Filed: Dec. 1, 2006

(65) Prior Publication Data
US 2008/0131132 A1 Jun. 5, 2008

(51) Int. Cl.
*G02B 6/00* (2006.01)

(52) U.S. Cl. ........................................... 385/135
(58) Field of Classification Search .................... 385/135
See application file for complete search history.

(56) References Cited

U.S. PATENT DOCUMENTS

| | | | |
|---|---|---|---|
| 4,976,510 A | 12/1990 | Davila et al. | |
| 5,109,467 A | 4/1992 | Hogan et al. | |
| 5,511,144 A | 4/1996 | Hawkins et al. | |
| 5,638,481 A | 6/1997 | Arnett | |
| 5,659,650 A | 8/1997 | Arnett | |
| 5,734,774 A * | 3/1998 | Morrell | 385/134 |
| 5,987,207 A * | 11/1999 | Hoke | 385/135 |
| 6,167,183 A | 12/2000 | Swain | |
| 6,275,639 B1 * | 8/2001 | Bolt et al. | 385/135 |
| 6,291,767 B1 | 9/2001 | Beecher, II et al. | |
| 6,315,598 B1 | 11/2001 | Elliot et al. | |
| 6,356,697 B1 | 3/2002 | Braga et al. | |
| 6,385,381 B1 | 5/2002 | Janus et al. | |
| 6,496,641 B1 | 12/2002 | Mahony | |
| 6,621,975 B2 | 9/2003 | Laporte et al. | |
| 6,661,961 B1 | 12/2003 | Allen et al. | |
| 6,721,484 B1 | 4/2004 | Blankenship et al. | |
| 6,778,752 B2 | 8/2004 | Laporte et al. | |
| 6,788,871 B2 * | 9/2004 | Taylor | 385/135 |
| 6,795,552 B1 | 9/2004 | Stanush et al. | |
| 6,815,612 B2 | 11/2004 | Bloodworth et al. | |
| 6,912,349 B2 * | 6/2005 | Clark et al. | 385/134 |

(Continued)

FOREIGN PATENT DOCUMENTS

EP 0 919 843 A1 6/1999

(Continued)

OTHER PUBLICATIONS

Invitation to Pay Additional Fees with Partial International Search mailed Apr. 2, 2008.
International Search Report and Written Opinion mailed Aug. 18, 2008.

*Primary Examiner* — Ryan Lepisto
(74) *Attorney, Agent, or Firm* — Merchant & Gould P.C.

(57) ABSTRACT

A network interface device includes a body, a cover, and a cable spool. The front of the body defines a forward interior in which telecommunications components are arranged. An optical adapter extends partially out of the forward interior at an optical coupling location. The cover includes a shroud that extends over the portion of the optical adapter extending out of the forward interior when the cover is closed. Sidewalls extend from the rear of the body to define a rearward pocket. The cable spool can be removably mounted within the rearward pocket. Alternatively, the cable spool can be fixed to the body and the sidewalls can be removed from the body to allow access to the cable spool.

14 Claims, 35 Drawing Sheets

U.S. PATENT DOCUMENTS

| | | |
|---|---|---|
| 6,926,449 B1 | 8/2005 | Keenum et al. |
| 7,035,399 B2 | 4/2006 | Gemme et al. |
| 7,346,253 B2 | 3/2008 | Bloodworth et al. |
| 2005/0123261 A1* | 6/2005 | Bellekens et al. ............ 385/135 |
| 2005/0145522 A1* | 7/2005 | Bloodworth et al. ......... 206/409 |
| 2005/0213920 A1 | 9/2005 | Tanaka et al. |

FOREIGN PATENT DOCUMENTS

| | | |
|---|---|---|
| EP | 1 316 829 A2 | 6/2003 |
| EP | 1 589 361 A1 | 10/2005 |

* cited by examiner

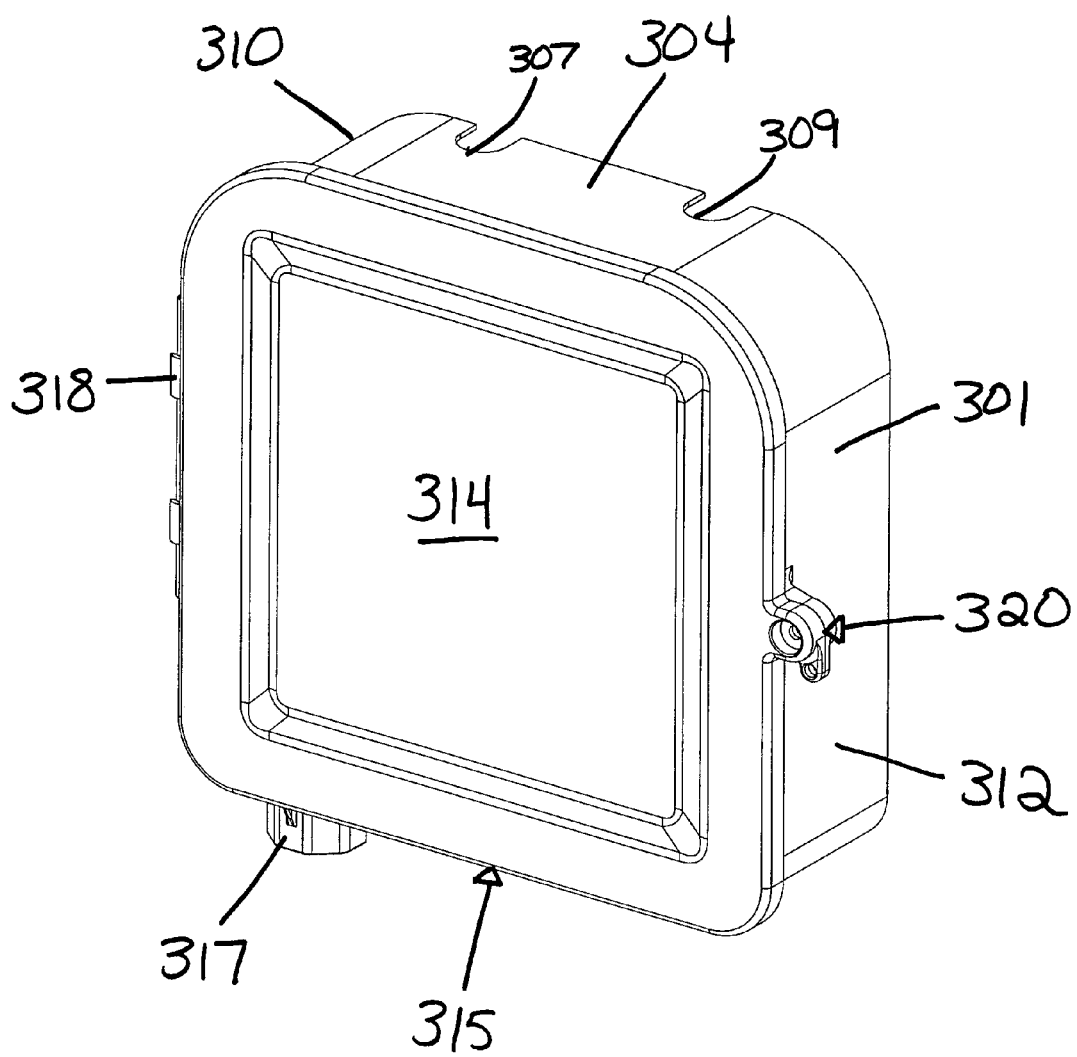

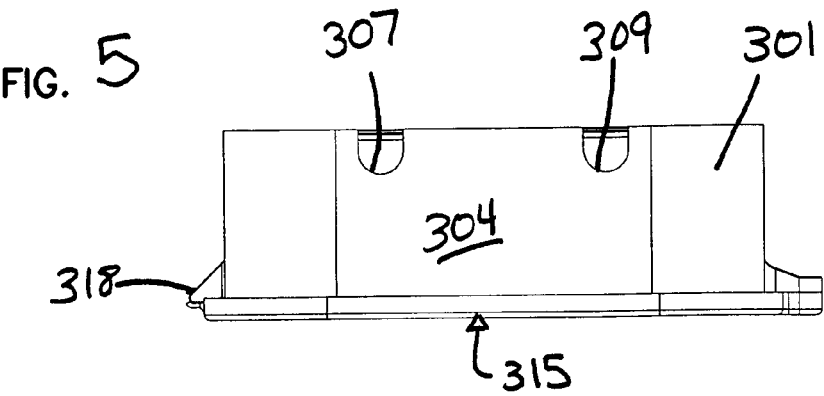
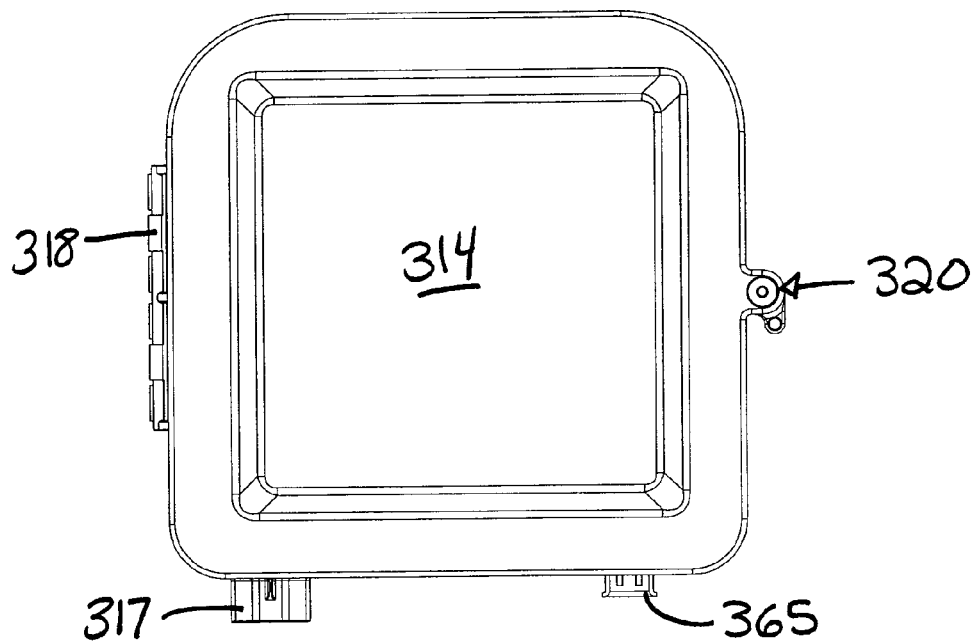
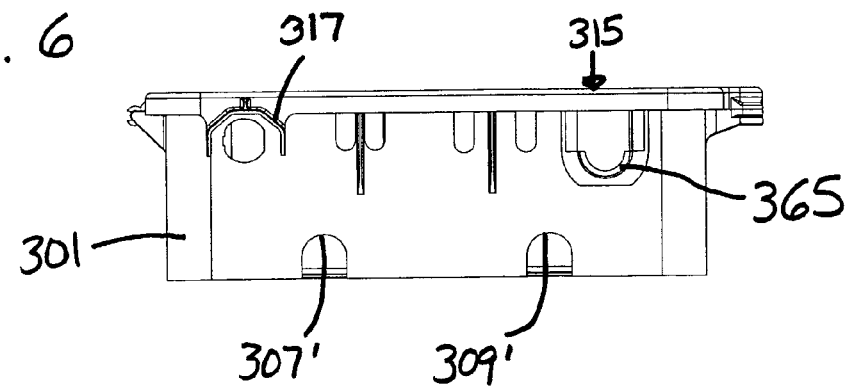

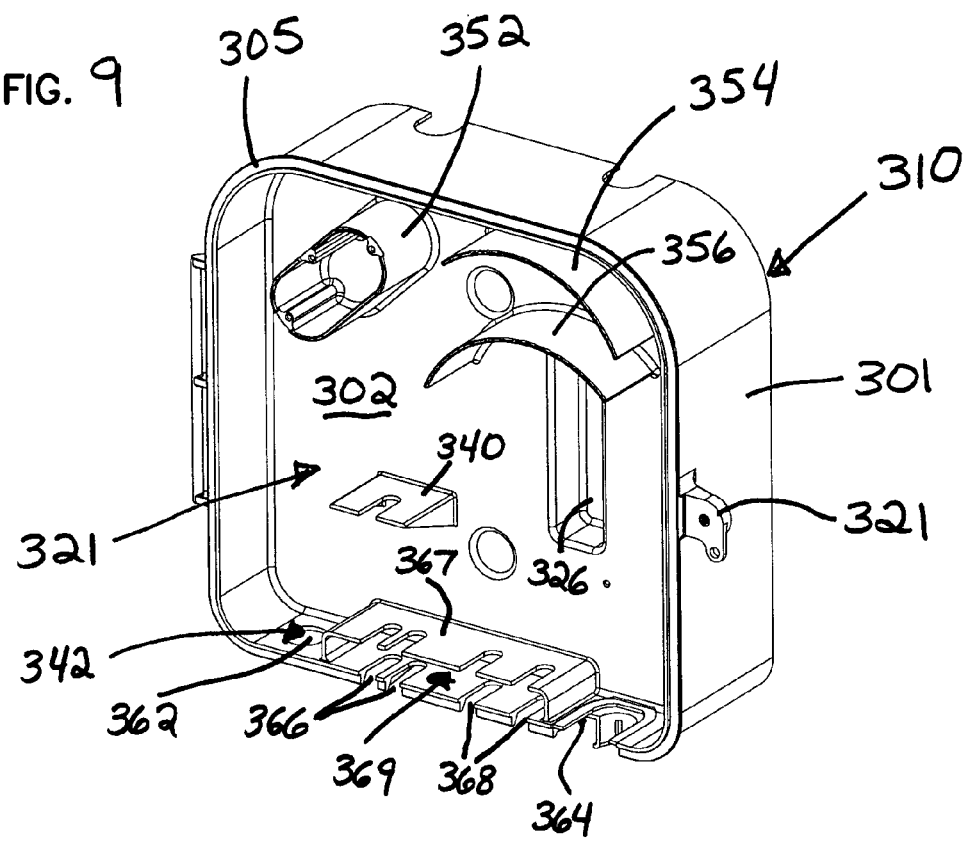
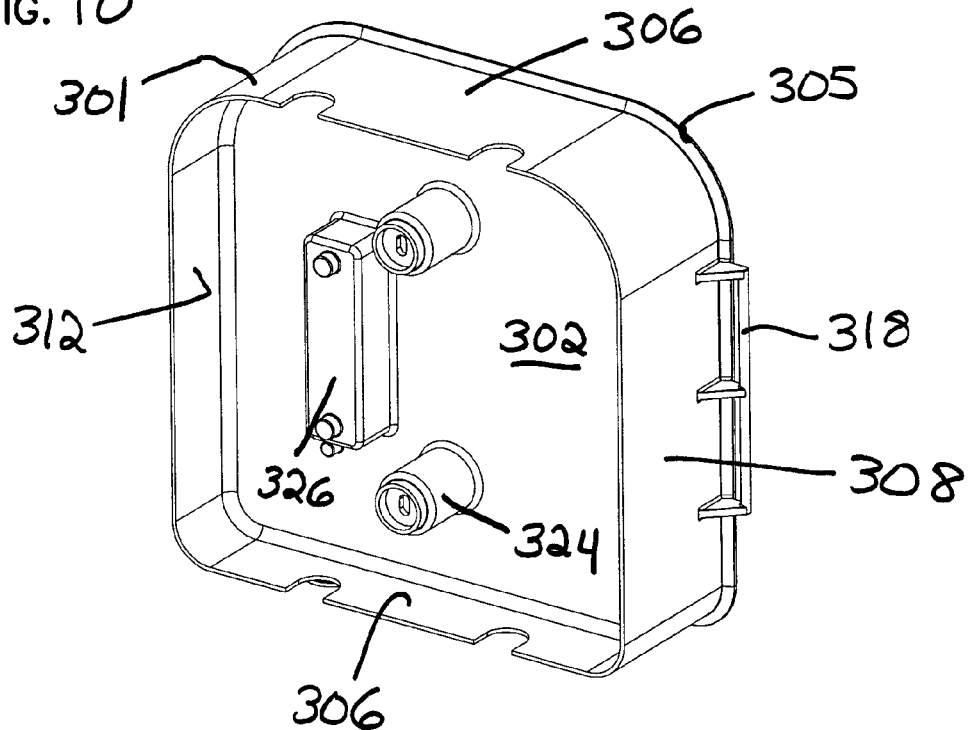

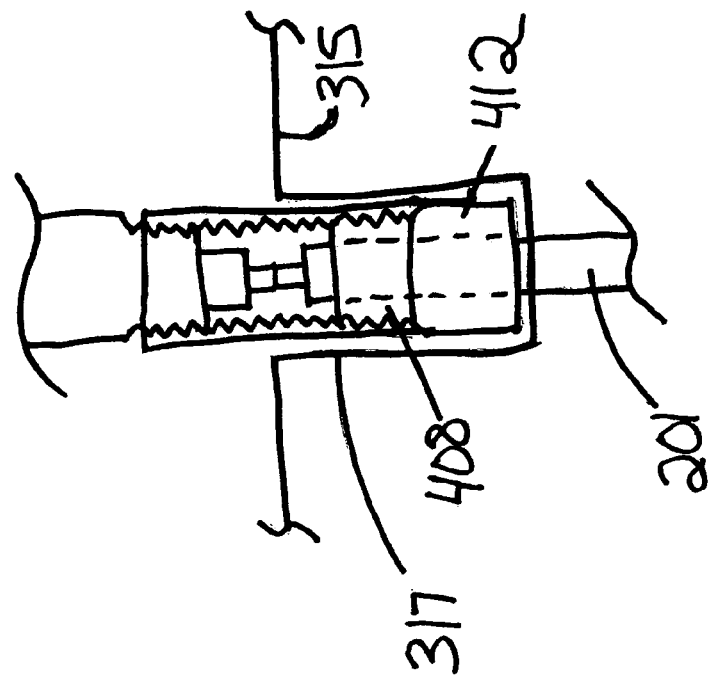
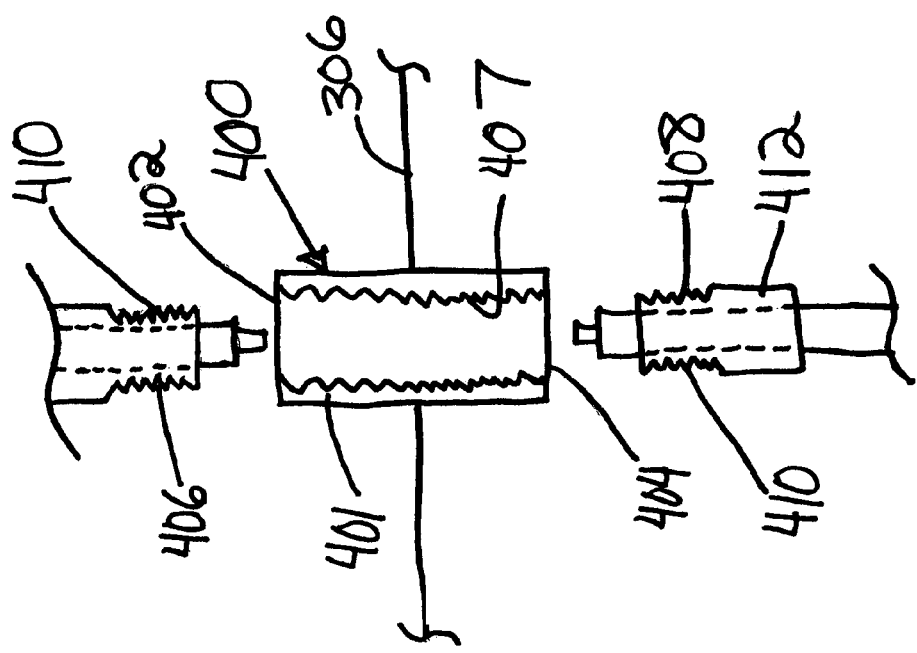

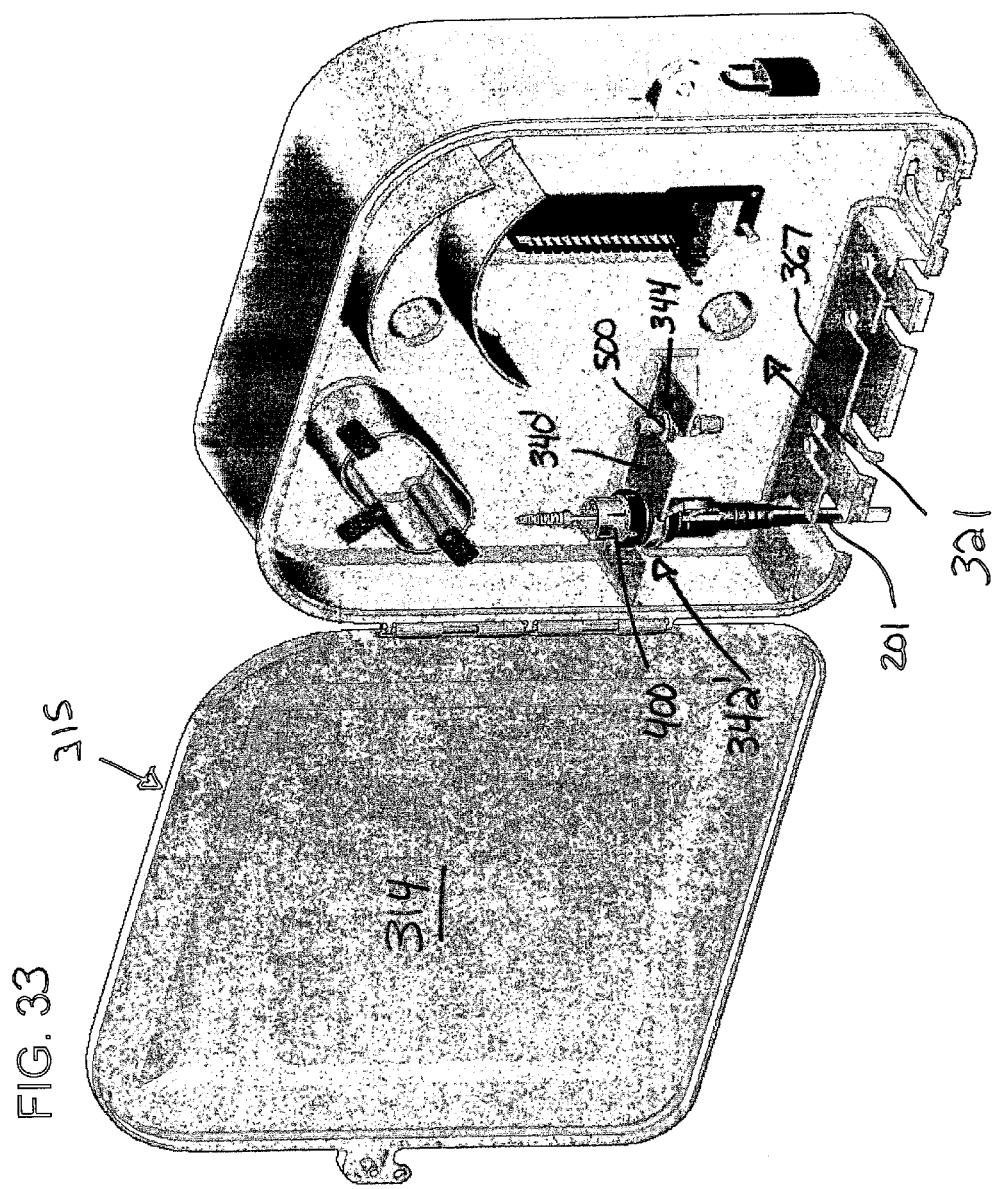

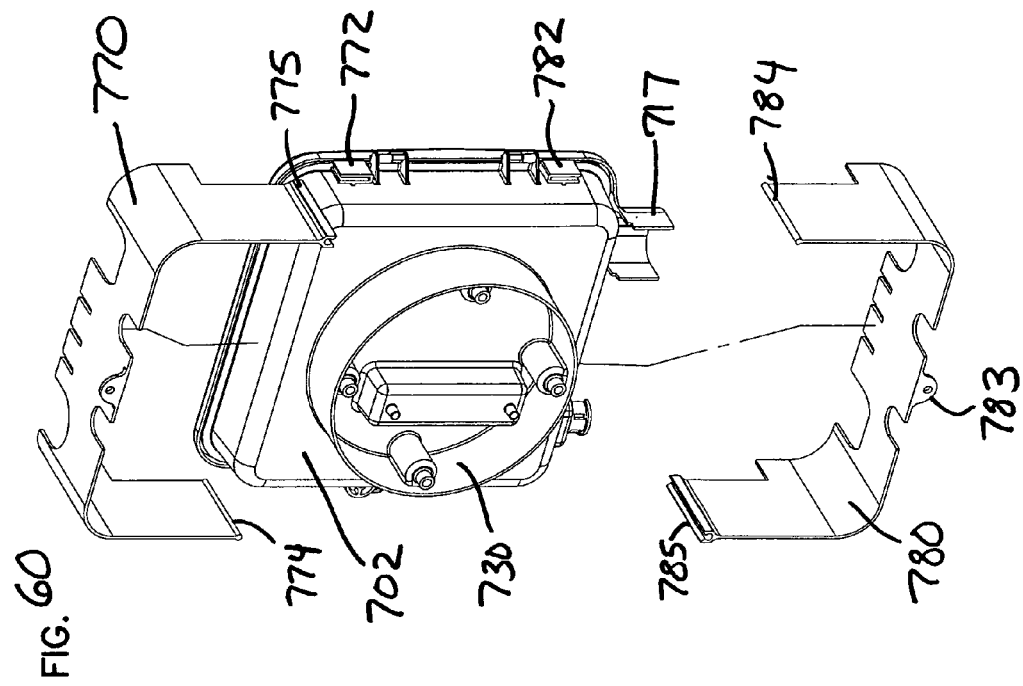
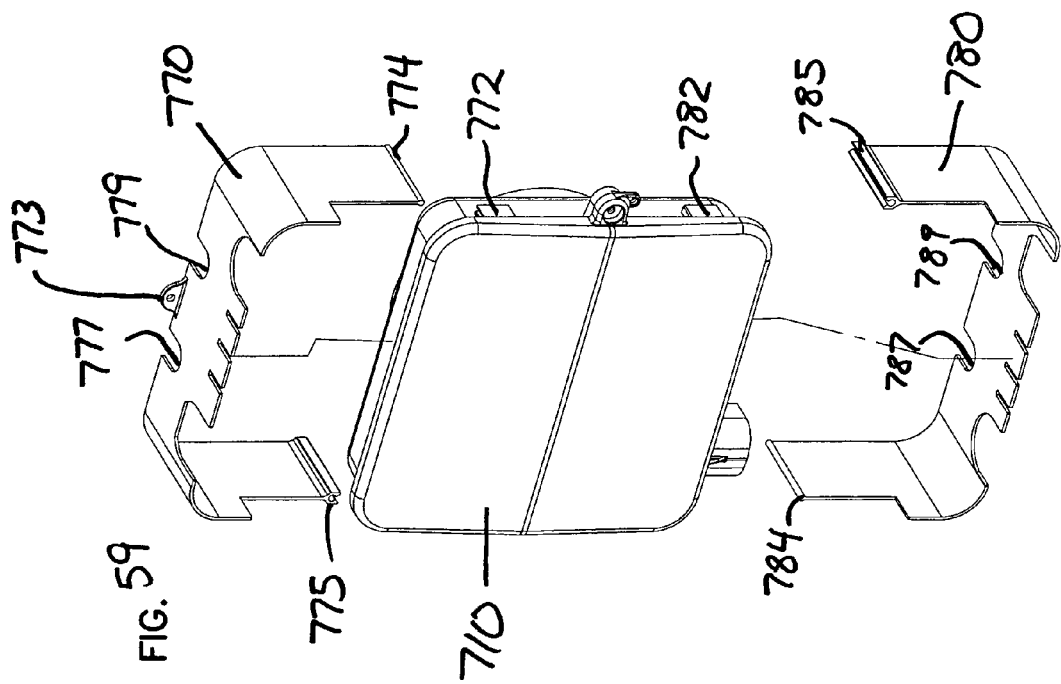

NETWORK INTERFACE DEVICE

TECHNICAL FIELD

The principles disclosed herein relate to telecommunications networks. More particularly, the present disclosure relates to network interface enclosures for telecommunications cable systems and methods of using the same.

BACKGROUND

Optical telecommunications networks are becoming prevalent in part because service providers want to deliver high bandwidth communication capabilities to subscribers. However, traditional telecommunications equipment within subscriber premises, e.g., homes and offices run over electrical cabling, such as coaxial cables and twisted pair cables.

Network interface devices enable such equipment to connect to an optical telecommunications network. However, forming the connections between the electrical system of the subscriber and the optical network system can be time consuming and/or expensive. In some cases, experienced technicians must form the connections.

There exists a need in the art for faster, cheaper, and/or better systems for connecting subscriber telecommunications equipment to an optical network.

SUMMARY

Certain aspects of the disclosure relate to network interface enclosures for coupling telecommunications equipment within customer premises to an optical fiber network.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The same reference numbers in different drawings may identify the same or similar elements.

FIG. 3 is a front, perspective view of a network interface device (NID) having features that are examples of inventive aspects in accordance with the principles of the present invention, the NID having a body and a cover;

FIG. 4 is a front view of the NID of FIG. 3;

FIG. 5 is a top view of the NID of FIG. 3;

FIG. 6 is a bottom view of the NID of FIG. 3;

FIG. 9 is a front, perspective view of NID of FIG. 3 with the cover removed;

FIG. 10 is a rear, perspective view of the NID of FIG. 9;

FIG. 23 is a schematic diagram showing a first fiber optic cable entering a first port of an optical adapter from inside a network interface device and a second fiber optic cable entering a second port of an optical adapter from outside the network interface device;

FIG. 24 is a schematic diagram showing the first and second fiber optic cables of FIG. 23 optically coupled by the optical adapter, the second fiber optic cable being covered by a shroud extending from a cover of the network interface device;

FIG. 33 is a front, perspective view of an alternative network interface device with the cover arranged in an open position to show a forward interior of the network interface device, the forward interior housing an optical coupling location and two electrical coupling locations;

FIG. 59 is a front, perspective view of the NID of FIG. 34 with the sidewall arrangement exploded from the body and cover;

FIG. 60 is a rear, perspective view of the NID of FIG. 59; and

DETAILED DESCRIPTION

The present disclosure relates to network interface devices for coupling telecommunications equipment within customer premises to optical fiber networks. The following detailed description does not limit the invention. Instead, the scope of the invention is defined by the appended claims and their equivalents.

Figure 1:
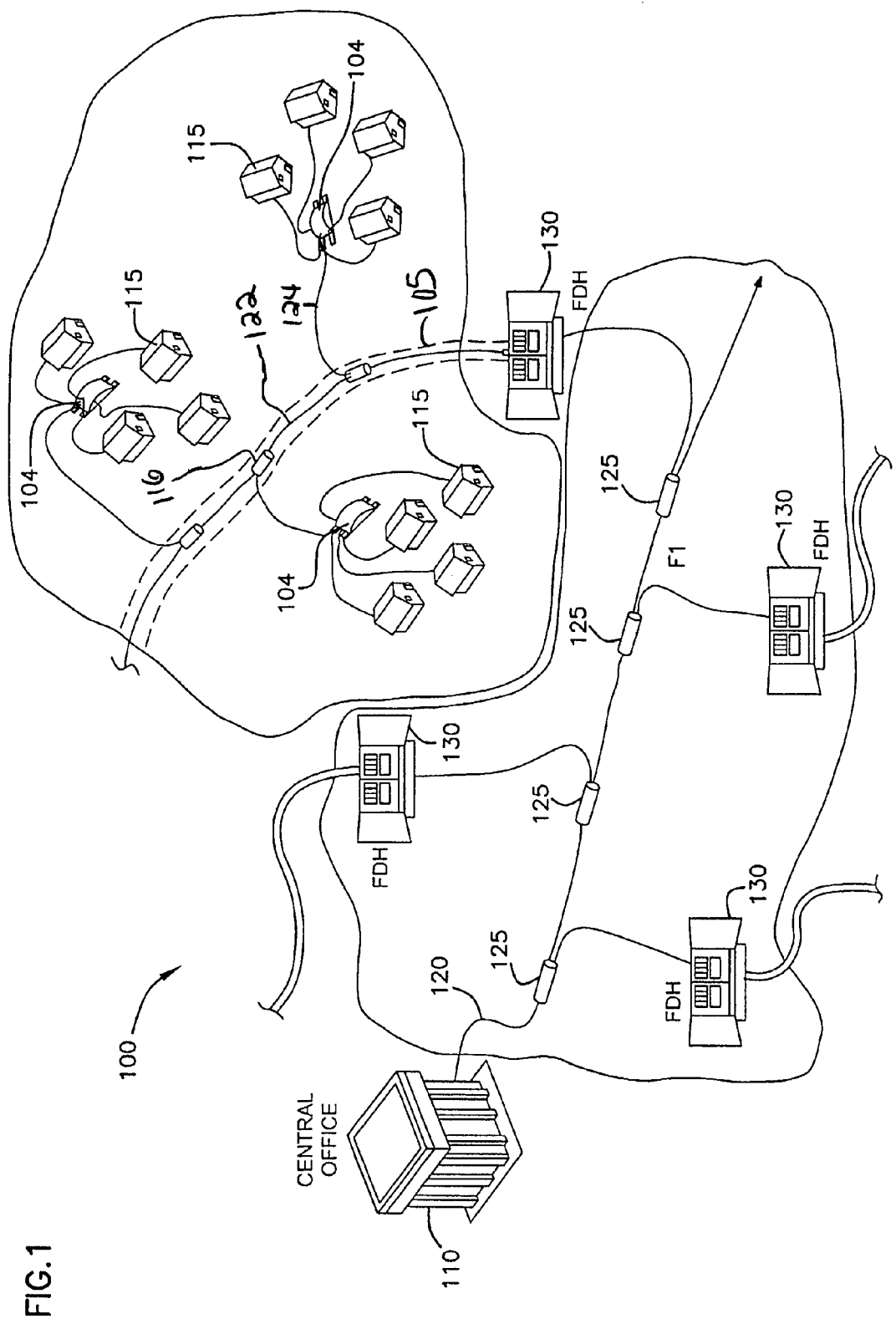
FIG. 1 illustrates an exemplary fiber optic network in accordance with the principles of the present invention.

FIG. 1 illustrates an exemplary passive optical network 100. As shown in FIG. 1, the network 100 may include a central office 110 that connects a number of end subscribers 115 (also called end users 115 herein) in a network. The central office 110 may additionally connect to a larger network, such as the Internet (not shown) or a public switched telephone network. The various lines of the network can be aerial or housed within underground conduits (e.g., see conduit 105).

In general, the network 100 includes feeder cables (e.g., main cable 120) associated at one end with the central office 110 and from which distribution cables branch. The main cable 120 may have on the order of 12 to 48 fibers; however, alternative implementations may include fewer or more fibers.

The network 100 may include fiber distribution hubs (FDHs) 130 that receive fibers of the feeder cable 120 extending from splice locations 125 and that output one or more distribution cables 122. In general, an FDH 130 is an equipment enclosure that may include a plurality of optical splitters (e.g., 1-to-8 splitters, 1-to-16 splitters, or 1-to-32 splitters) for splitting the incoming fibers of the feeder cable 120 into a number (e.g., 216 to 432) of output distribution fibers. The distribution cable 122 extends from an FDH 130 to a number of end users 115.

The network 100 typically includes breakout locations 116 at which branch cables (e.g., drop cables, stub cables, etc.) 124 are separated out from or electrically coupled (e.g., spliced, connectorized, etc.) to distribution cables 122. Stub cables are typically routed from breakout locations 116 to intermediate access locations 104 such as a pedestals, drop terminals, or hubs. Intermediate access locations 104 can provide connector interfaces located between breakout locations 116 and the subscriber locations 115.

Drop cables are cables that typically form the last leg to a subscriber location 115. For example, drop cables can be routed from intermediate access locations 104 to subscriber locations 115. Drop cables also can be routed directly from breakout locations 116 to subscriber locations 115, thereby bypassing any intermediate access locations 104.

In certain embodiments, branch cables 124 can be coupled to distribution cables 122 using factory integrated terminations to provide environmentally sound and cost effective splicing protection. Factory integrated terminations may use factory integrated access (tap) points at specified points, such as at breakout locations 116, in the network 100 instead of manually installed splices. These access points 116 may be connectorized to provide a simple plug and play approach in the distribution portion of the network 100 when connecting subscribers 115 to the network 100. For example, implementations consistent with the principles of the invention may use rugged Outside Plant (OSP) connectors that can accommodate single or multi-port connectors.

Figure 2:
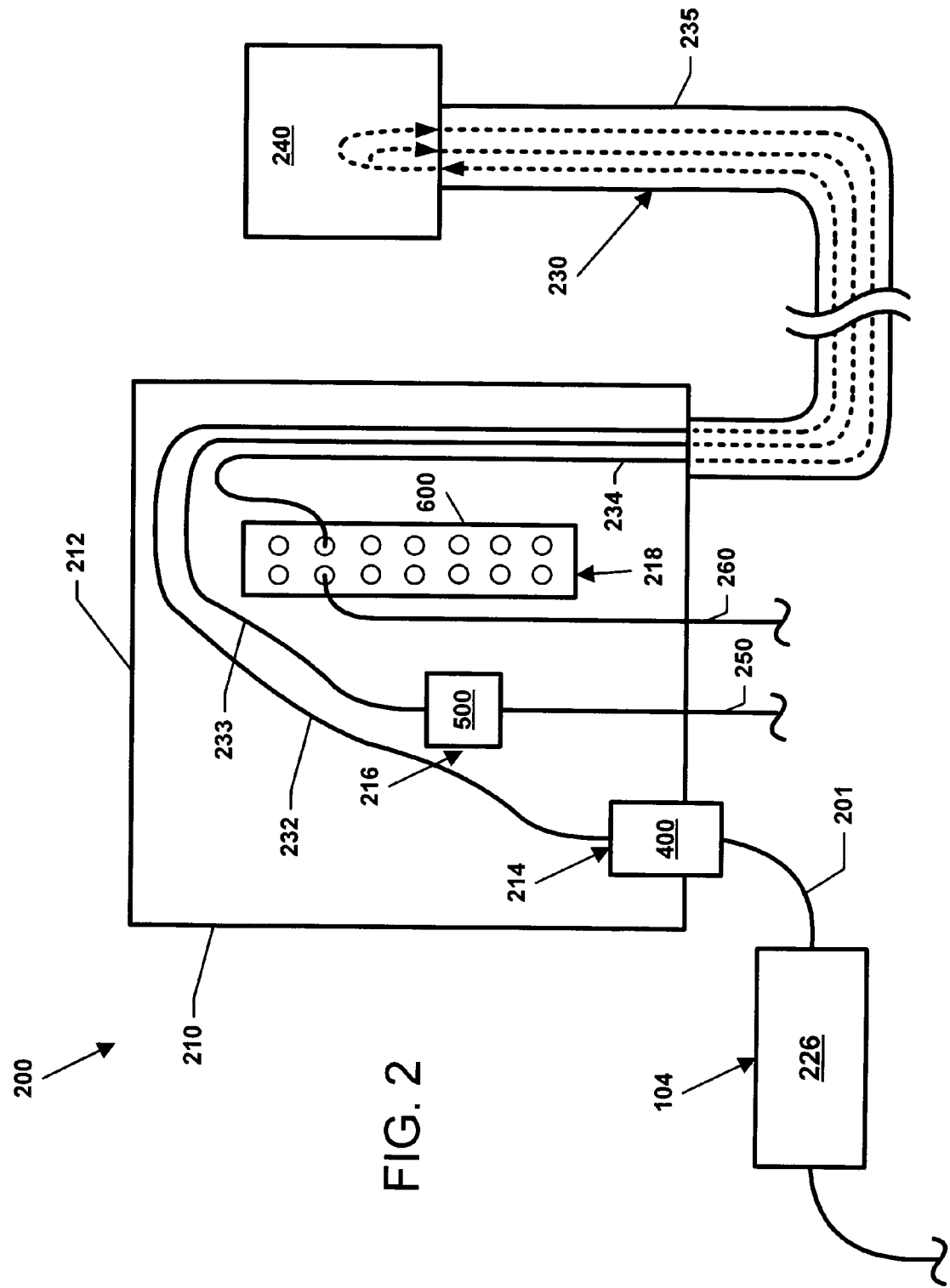
FIG. 2 illustrates a schematic cabling diagram showing an example cable routing scheme for a network interface system in accordance with the principles of the present invention.

Referring now to FIG. 2, a telecommunications system 200 can include a network interface device 210 provided at a subscriber's premises 115 (FIG. 1). The network interface device 210 includes an enclosure 212 housing an optical fiber coupling location 214, a coaxial cable coupling location 216, and a twisted pair coupling location 218. Typically, the enclosure 212 is configured to mount to an outer wall of the subscriber premises 115 (FIG. 1).

The network interface device 210 is configured to interface with an incoming fiber cable 201, such as a fiber drop cable, from a fiber drop terminal 226. Fiber drop terminals 226 are generally located at intermediate access locations 104 and receive optical signals from distribution cables 122 (FIG. 1) via branch cables 124. Alternatively, the incoming fiber cable 201 can be branched out directly from the distribution cable 122. In an embodiment, the incoming fiber cable 201 can include a plurality of fibers. For example, the network interface enclosure 210 can be configured to receive a connectorized end (e.g., an MT connector) of the incoming fiber cable 201. In another embodiment, the incoming fiber cable 201 includes a single optical fiber.

Figure 25:
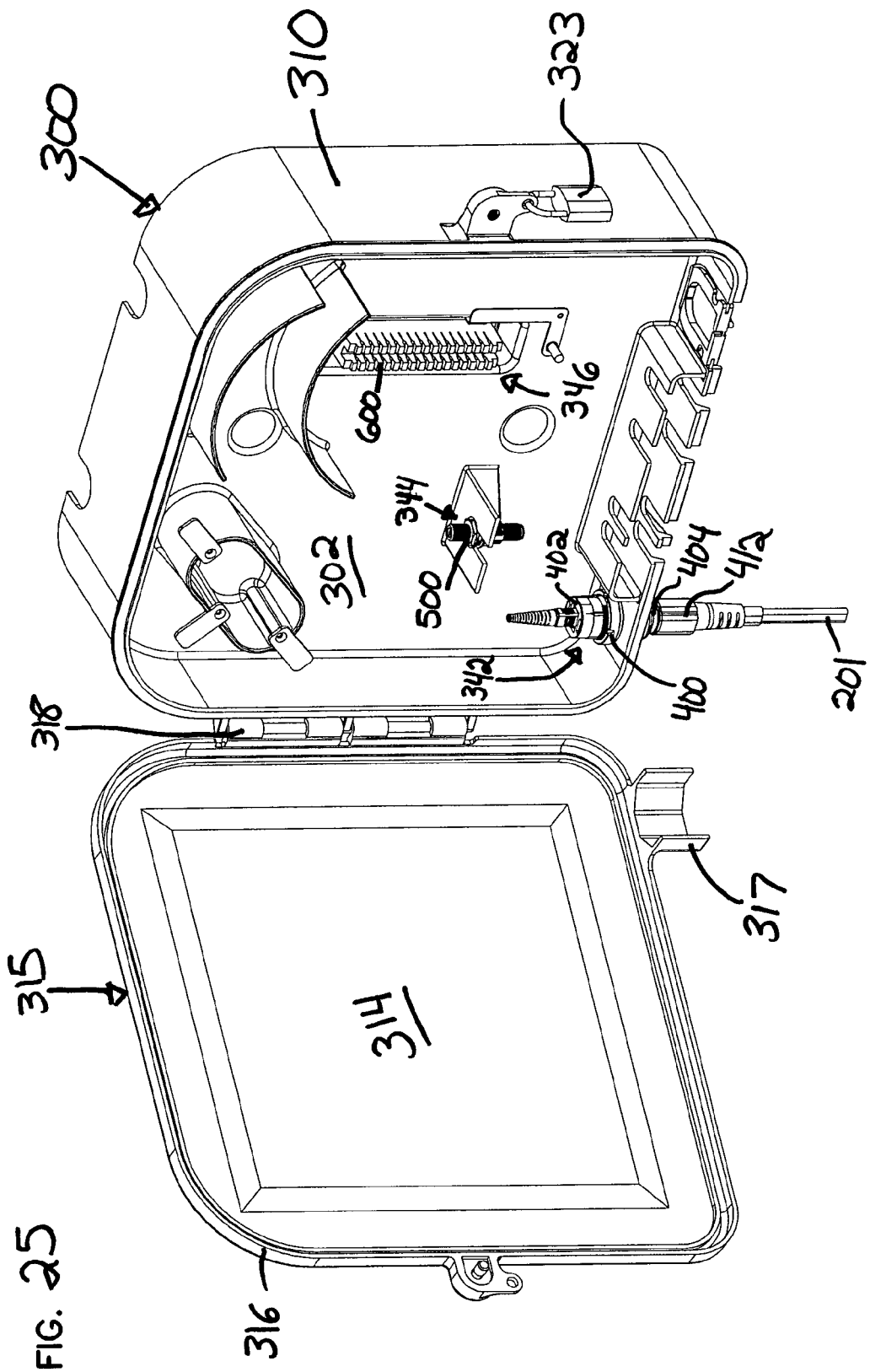
FIG. 25 is a front, perspective view of a NID of FIG. 3 with the cover arranged in an open position, an optical adapter mounted at an optical coupling location, a coaxial cable adapter mounted at a coaxial coupling location, and a twisted pair cable adapter mounted at a twisted pair coupling location.

The fibers of the incoming fiber cable 201 are interfaced with at least one optical fiber 232 at the optical fiber coupling location 214. The optical fiber coupling location 214 can include a fiber optic adapter 500 (FIG. 25). For example, the fiber optic adapter 500 can be a multi-fiber termination adapter configured to optically couple two connectorized multi-termination cables. Alternatively, the fiber optic adapter 500 can be configured to optically couple two single fiber connectors.

In certain embodiments, the optical fiber 232 joins with a first coaxial cable 233 and a first twisted pair cable 234 to form a hybrid cable 230. The hybrid cable 230 extends from a first end 236 arranged within the interior of the network interface device 210 to a second end 238. A cable jacket or sheath 235 can enclose the optical fiber 232, the first coaxial cable 233, and the first twisted pair cable 234 of the hybrid cable 230. The second end 238 of the hybrid cable 230 is routed to a conversion box 240 arranged external of the network interface device 210. Typically, the conversion box 240 is arranged within the subscriber premises 115 (FIG. 1) to protect the conversion box 240 from the environment.

At the conversion box 240, at least some of the signals carried over the optical fiber 232 are transferred to the first coaxial cable 233 and to the first twisted pair cable 234. Further details on one example conversion box 240 can be found in U.S. patent application Ser. No. 11/107,341, filed on Jun. 30, 2005, and entitled CONVERSION MODULE AND CHASSIS ARRANGEMENT AND RELATED METHODS, the disclosure of which is hereby incorporated by reference. The transferred signals travel over the first coaxial cable 233 and the first twisted pair cable 234 of the hybrid cable 230 back to the enclosure 212 of the network interface device 210.

The first coaxial cable 233 is routed within the enclosure 212 to the coaxial coupling location 216 at which the first coaxial cable 233 is electrically coupled to a second, outgoing coaxial cable 250. The second coaxial cable 250 is routed from the coaxial coupling location 216, out of the enclosure 212, to telecommunications equipment, such as a coaxial cable interface, provided at the subscriber's premises 115 (FIG. 1). At the coaxial cable interface (not shown), the second coaxial cable 250 is interfaced with the coaxial cable system routed within the subscriber premises 115. Thus, the signals carried over the first coaxial cable 233 from the conversion box 240 are transferred to the second coaxial cable 250 at the enclosure 212, and transmitted to telecommunications equipment, for example, a cable box or a modem, within the subscriber premises 115 via the coaxial cable interface.

The first twisted pair cable 234 is routed within the enclosure 212 to the twisted pair coupling location 218. The twisted pair coupling location 218 is configured to electrically couple the first twisted pair cable 234 to a second twisted pair cable 260 extending out of the enclosure 212 and to telecommunications equipment, such as a phone-line interconnect, provided at the subscriber's premises 115 (FIG. 1). At the twisted pair interface (not shown), the second twisted pair cable 260 is interfaced with the twisted pair cable system routed within the subscriber premises 115. Thus, the signals carried over the first twisted pair cable 234 from the conversion box 240 are transferred to the second twisted pair cable 260 at the enclosure 212, and transmitted to the telecommunications equipment, such as a phone jack, within the subscriber premises 115 (FIG. 1) via the twisted pair interface.

Figure 8:
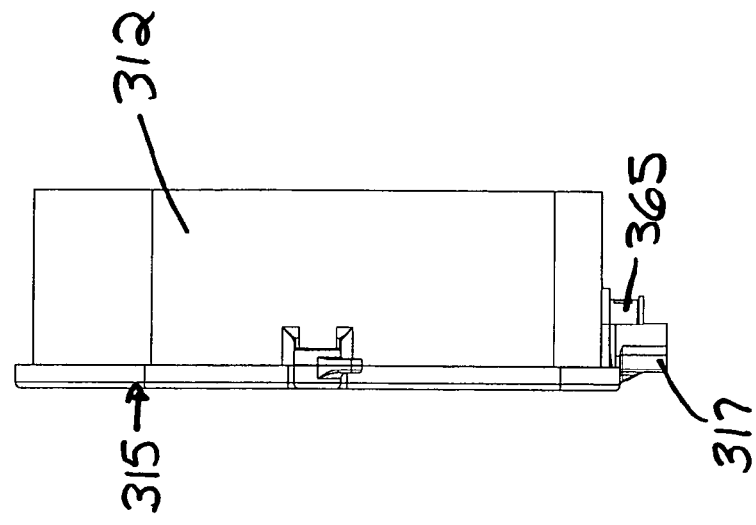
FIG. 8 is a right side view of the NID of FIG. 3.
Figure 7:
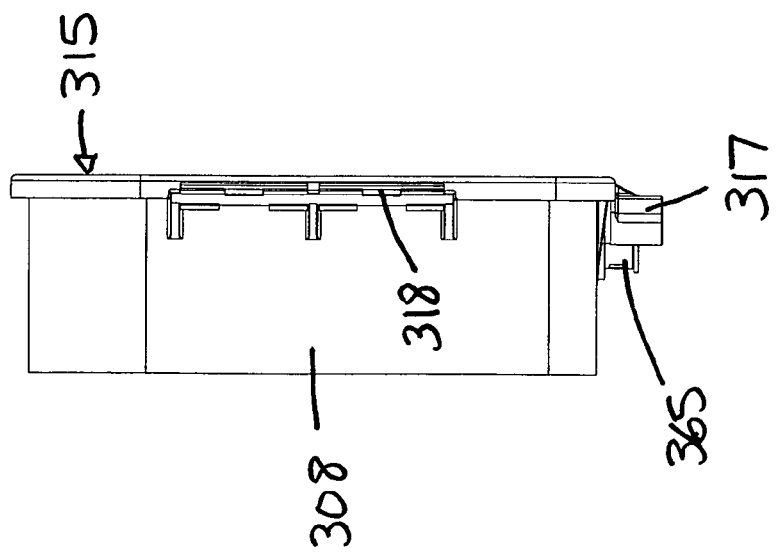
FIG. 7 is a left side view of the NID of FIG. 3.
Figure 12:
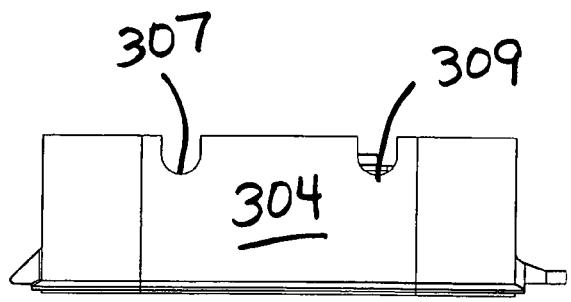
FIG. 12 is a top view of the NID of FIG. 9.
Figure 11:
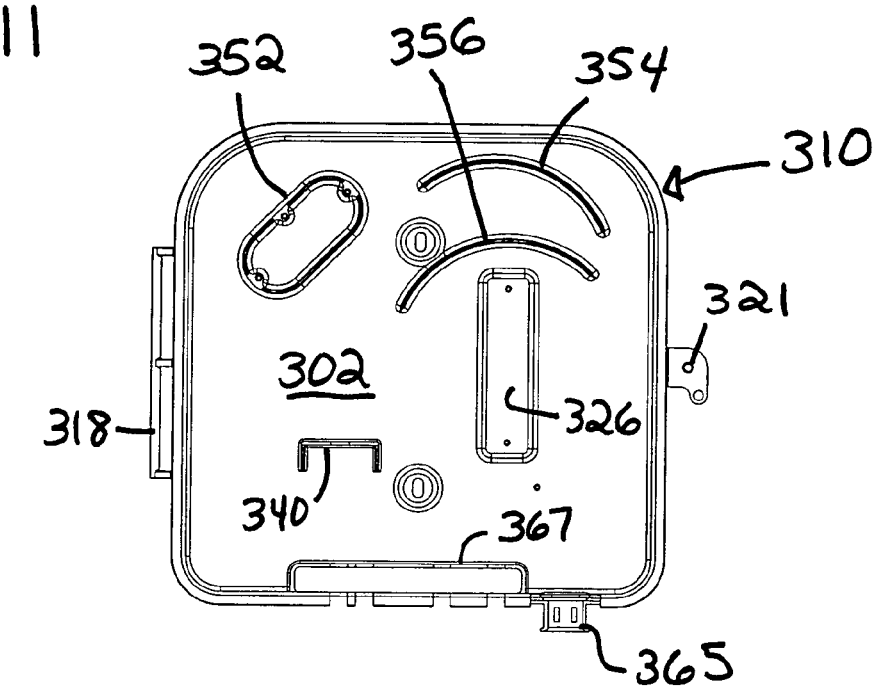
FIG. 11 is a front view of the NID of FIG. 9.
Figure 13:
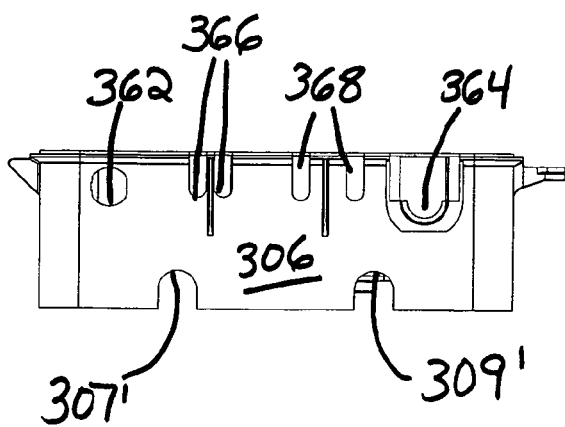
FIG. 13 is a bottom view of the NID of FIG. 9.
Figure 15:
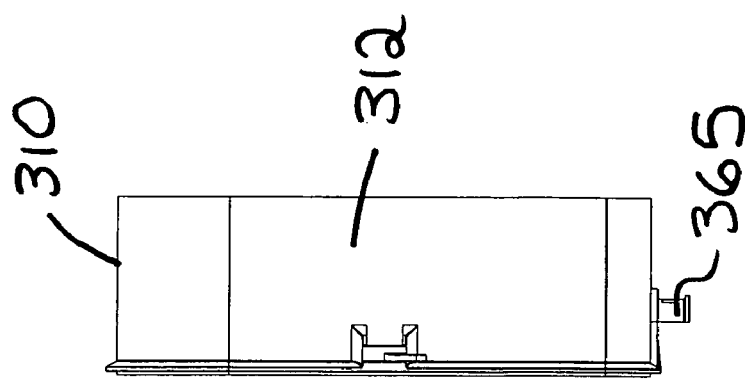
FIG. 15 is a right side view of the NID of FIG. 9.
Figure 14:
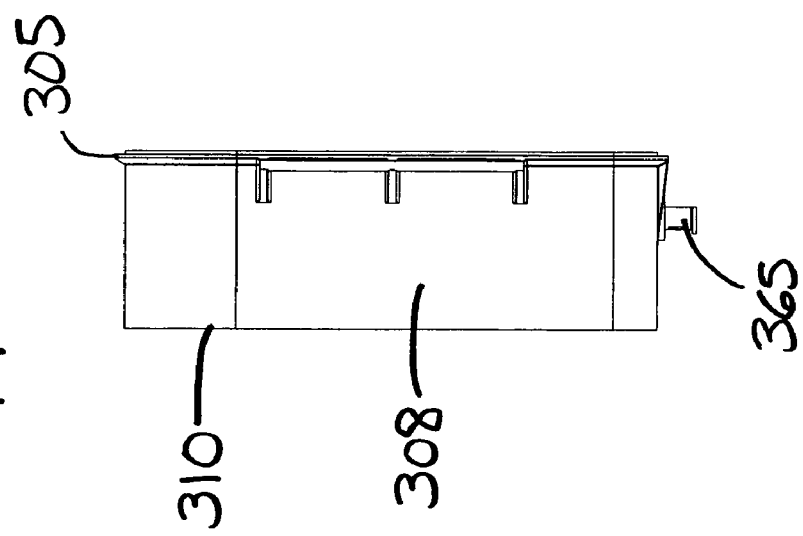
FIG. 14 is a left side view of the NID of FIG. 9.
Figure 16:
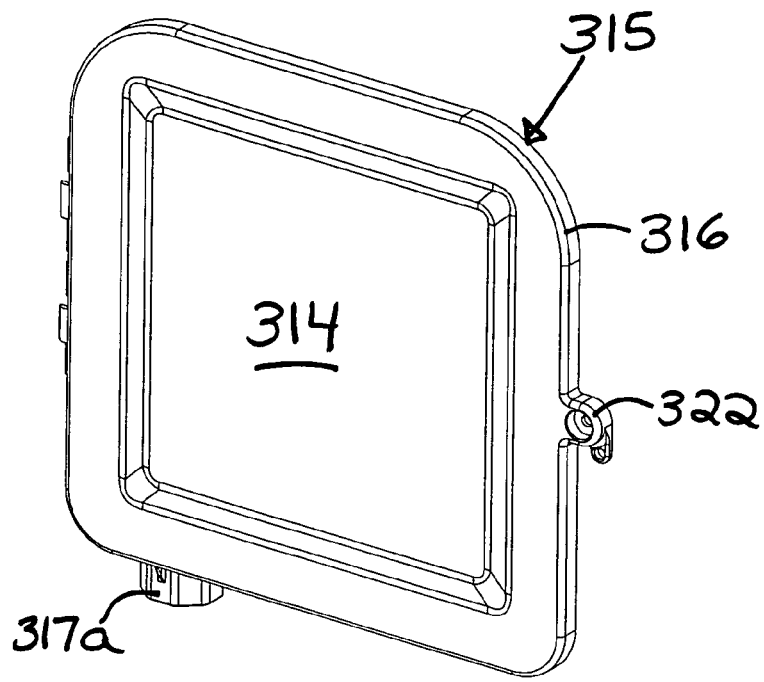
FIG. 16 is a front, perspective view of the cover of the NID of FIG. 3.

Referring now to FIGS. 3-30, an example embodiment 300 of a network enclosure device 210 having features that are examples of inventive aspects in accordance with the present disclosure is shown. The network enclosure device 300 includes a body 310 (FIG. 3) having a top wall 304 (FIG. 5), a bottom wall 306 (FIG. 6), a first side wall 308 (FIG. 7), and a second side wall 312 (FIG. 8). The top wall 304, bottom wall 306, first side wall 308, and second side wall 312 generally extend forwardly from a base wall 302 to form a forward interior 321 in which telecommunications components can be arranged (FIG. 9).

In an embodiment, the walls 304, 306, 308, 312 extend forwardly of the base wall 302 to form a continuous sidewall arrangement 301 (FIG. 9) around the perimeter of the base wall 302. One or more flanges can extend from the side walls 304, 306, 308, 312 parallel with the base wall 302 to form a front lip or ledge 305 around the perimeter of the body 310 (FIG. 10). A trough 326 can protrude rearwardly from the rear wall 302 (FIG. 10). In an embodiment, the trough 326 is hollow to facilitate mounting one or more telecommunications components within the forward interior 321 of the network interface device 300 (e.g., see FIGS. 9 and 23).

As shown in FIG. 3, a cover 315 (see FIGS. 16-22) can be pivotally mounted to the body 310 to protect the telecommunication components arranged within the forward interior 321 of the body 310. For example, the cover 315 can be mounted to the body 310 with hinges 318 (FIG. 23). In an embodiment, hinges 318 are arranged on the first side wall 308 of the body 310 (FIG. 10).

Figure 17:
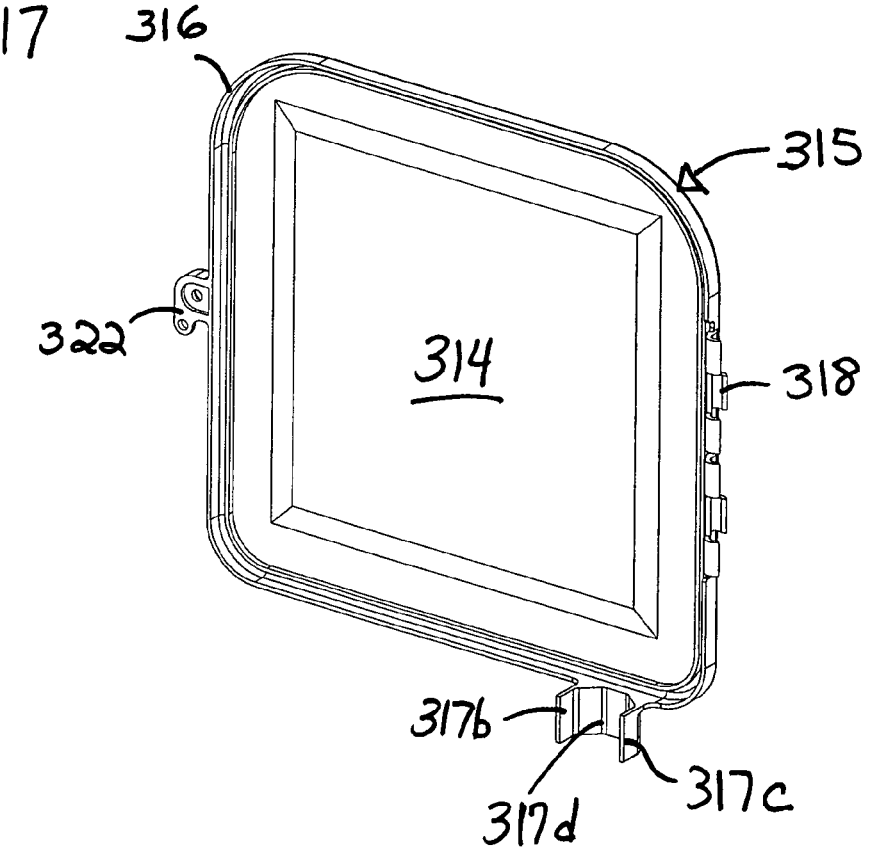
FIG. 17 is a rear, perspective view of the cover of FIG. 16.
Figure 19:
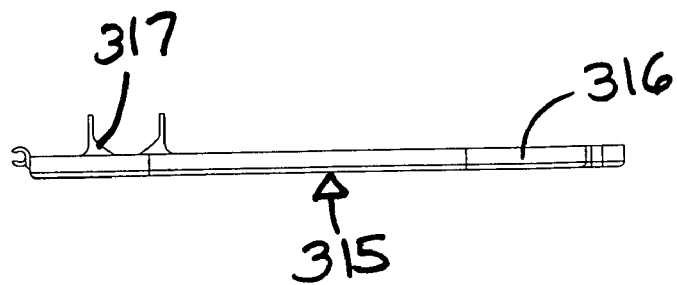
FIG. 19 is a top view of the cover of FIG. 16.
Figure 18:
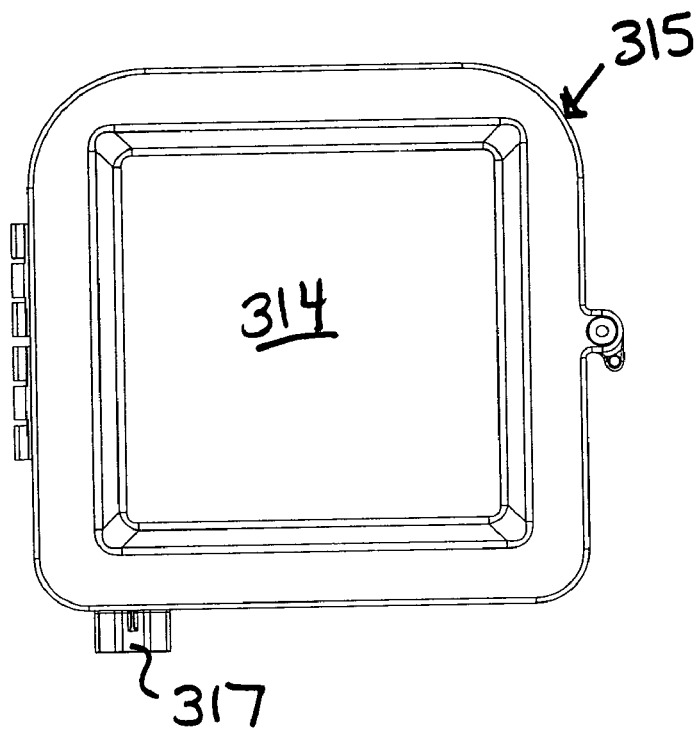
FIG. 18 is a front view of the cover of FIG. 16.
Figure 20:
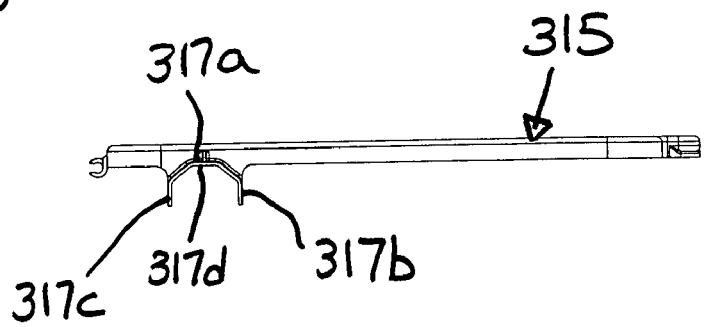
FIG. 20 is a bottom view of the cover of FIG. 16.
Figure 22:
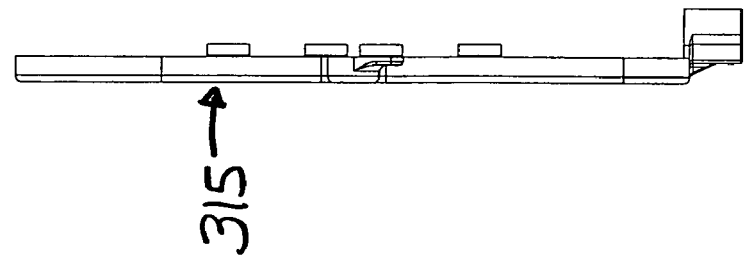
FIG. 22 is a right side view of the cover of FIG. 16.
Figure 21:
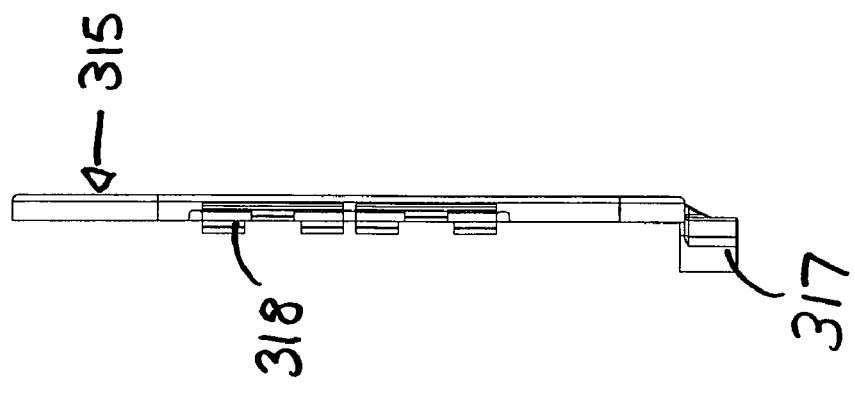
FIG. 21 is a left side view of the cover of FIG. 16.
Figure 26:
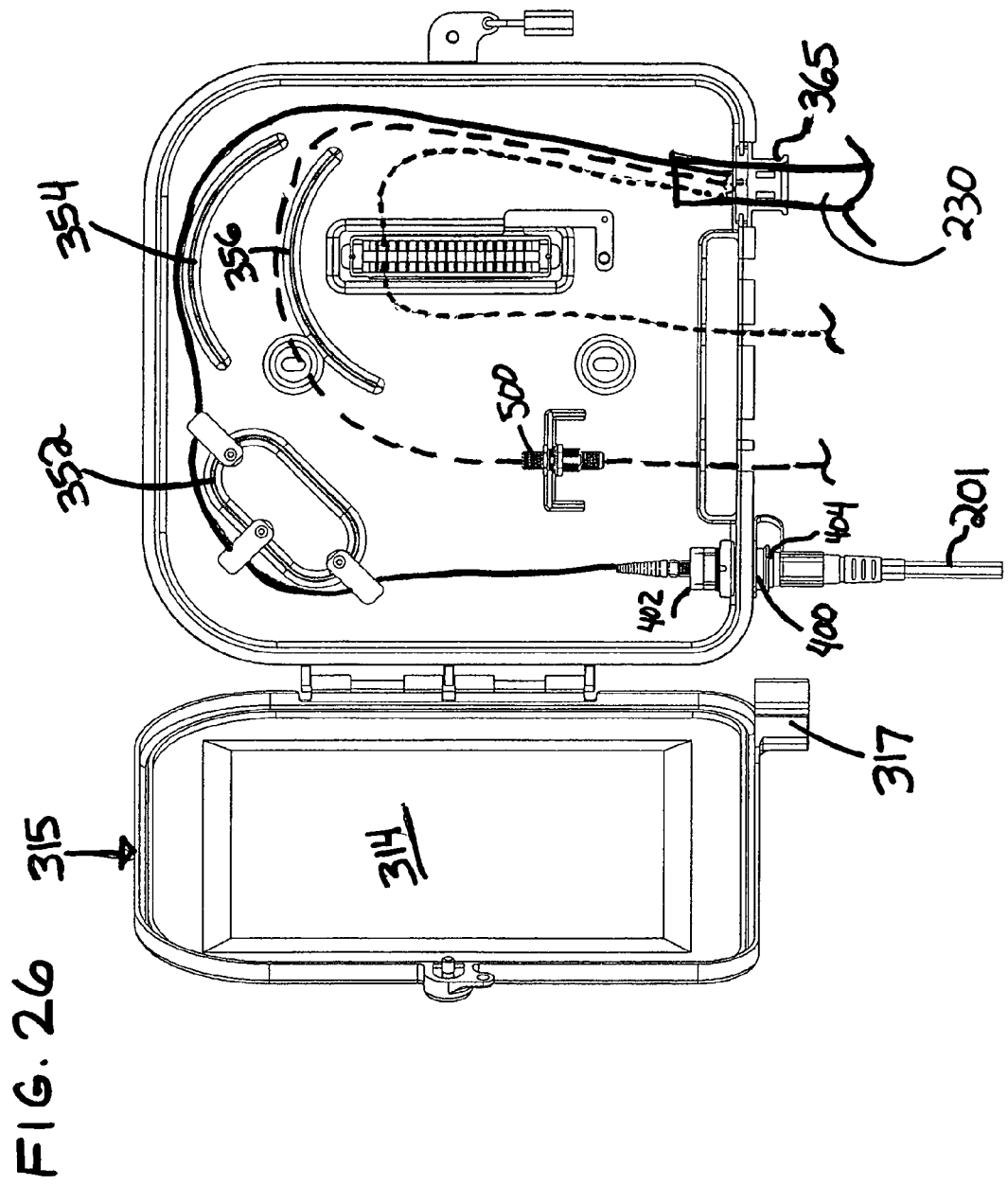
FIG. 26 is a front view of the NID of FIG. 25 showing an exemplary cable routing scheme for a hybrid cable.
Figure 27:
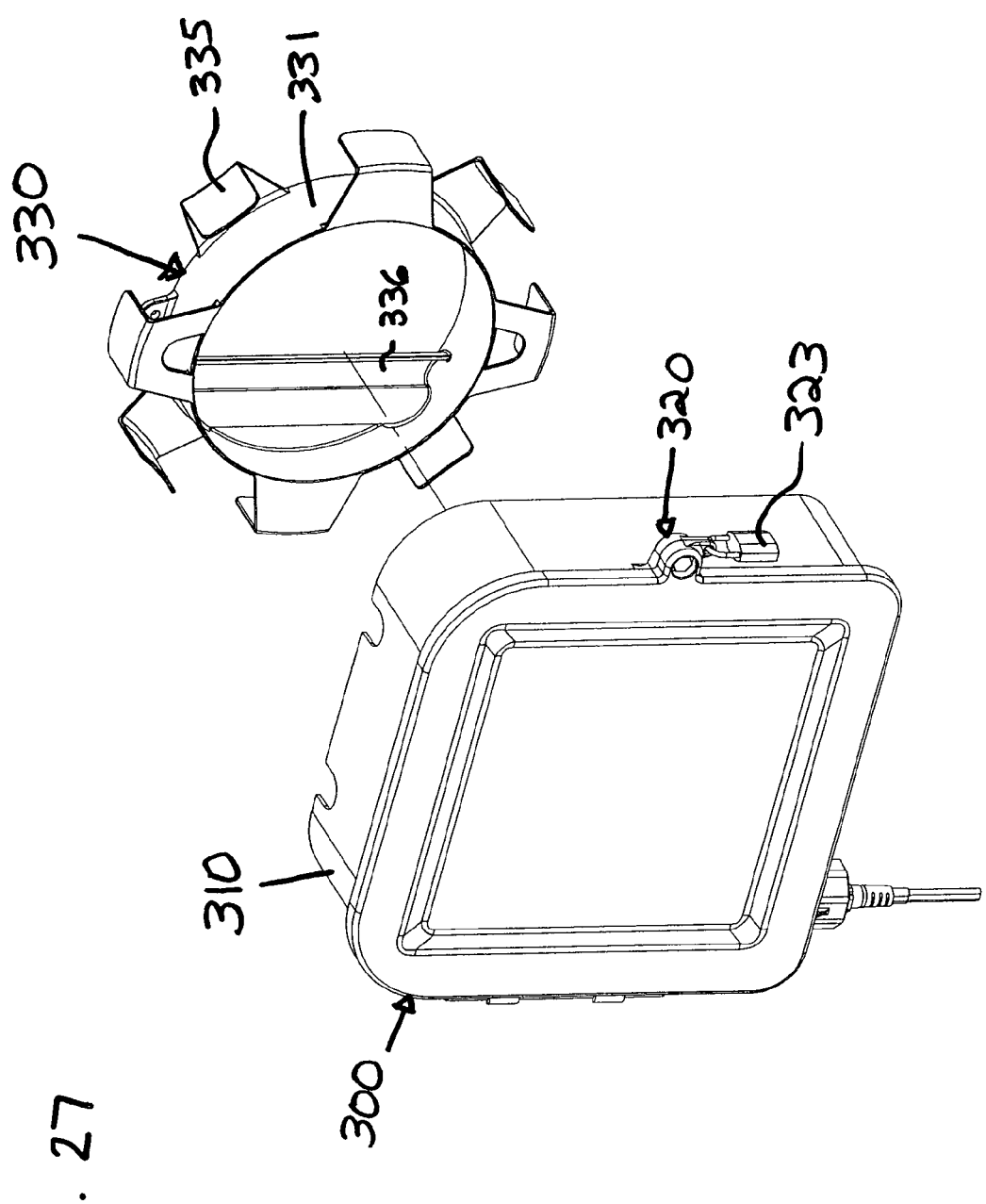
FIG. 27 is a front, perspective view of the NID of FIG. 3 with an optical cable plugged into an optical coupling location and a cable spool exploded from the rear of the NID.

The cover 315 includes a front wall 314 configured to generally extend from the top wall 304 of the body 310 to the bottom wall 306 and from the first side wall 308 to the second side wall 312 (see FIG. 3). In an embodiment, the cover 315 extends from one side of the ledge 305 of the body 310 to an opposite side of the ledge 305 (FIG. 26). In certain embodiments, the cover 315 includes a side wall 316 extending rearwardly from the perimeter of the front wall 314 (FIG. 17).

FIGS. 3-8 illustrate the example network enclosure device 300 with the cover 315 in a closed position. The cover 315 can be locked in the closed position using locking mechanism 320 (FIG. 3). In the example shown, locking mechanism 320 includes a first flange 321 (FIG. 9) extending from the second side wall 312 of the body 310 and a second flange 322 (FIG. 16) extending from the side wall 316 of the cover 315. Flange 321 defines an opening aligned with an opening defined by flange 322. A lock 323, such as a padlock, can be inserted through the openings defined in the flanges 321, 322 to secure the cover 315 in a closed position (FIG. 25). In other embodiments, however, other locking mechanisms can be used.

FIGS. 9, 11, 23 and 24 show the forward interior 321 of the example network interface device 300. A shelf 340 can protrude forwardly from the base wall 302 within the forward interior 321 of the body 310 (FIG. 9). In the example shown in FIG. 23, the shelf 340 defines a coaxial coupling location 344. For example, the shelf 340 can define a slot 344 configured to receive a coaxial cable adapter 500 (FIG. 25). Alternatively, the shelf 340 can define an opening through which the coaxial adapter 500 can be mounted.

A twisted pair coupling location 346 (FIG. 25) is also arranged within the interior of the body 310. In the example shown in FIG. 25, the twisted pair coupling location 346 is arranged within the hollow portion of the trough 326. In an embodiment, a twisted pair connection block 600 is mounted within the trough 326. The twisted pair connection block 600 is configured to electrically couple one or more twisted pairs of the first twisted pair cable 234 to the twisted pairs of the second twisted pair cable 260. In an embodiment, the connection block 600 supports a plurality of insulation displacement connectors. Further details regarding one example embodiment of a twisted pair connection block 600 can be found e.g., in U.S. Pat. No. 5,494,461; issued Feb. 27, 1996, and entitled "Terminal Block for High Transmission Rates in the Telecommunications and Data Technique," the disclosure of which is hereby incorporated by reference.

The network interface device 300 also defines an optical coupling location 342 at which a fiber optic adapter 400 can be mounted (FIGS. 23-26). In the example shown, the optical coupling location 342 is at a first opening 362 or slot defined in the bottom wall 306 of the body 310 (FIG. 9). In other embodiments, the optical coupling location 342 can be provided at an opening or slot (not shown) defined elsewhere in the sidewall 301.

As shown in FIG. 23, the fiber optic adapter 400 has a body 401 that generally extends from a first end 402 to a second end 404. FIG. 23 is a schematic diagram of an adapter 400. Each end 402, 404 of the adapter 400 defines a port for receiving an optical connector (e.g., see FIGS. 23-24). The first end 402 is configured to receive an optical connector 406 of the first optical fiber 232 from inside the body 310. The second end 404 of the body 401 is configured to receive an optical connector 408 of the incoming optical cable 201 (e.g., a connectorized end of a drop cable) from outside the body 310. In an actual optical adapter, optical connectors 406, 408 would be received within an alignment sleeve (not shown) mounted within the adapter 400.

In some embodiments, fiber optic connectors 406, 408 can be removably coupled to the ends 402, 404, respectively, of the fiber optic adapter 400. In an embodiment, the fiber optic connectors 406, 408 each can include a rotatable, threaded portion 410 (e.g., see FIG. 23) that can engage a threaded section 407 of the fiber optic adapter 400. The threaded portion 410 can coupled to a rotatable grip portion 412 by which the threaded portion can be twisted into and out of the adapter 400.

As best seen in FIG. 17, the cover 315 includes a protective shroud 317 extending downwardly from the cover 315. The protective shroud 317 is positioned to be adjacent the optical coupling location 342 when the cover 315 is mounted to the body 310 and arranged in the closed position. The shroud 317 is configured to cover the grip portion 412 of the connector 408 terminating the incoming optical cable 201 (e.g., see FIGS. 24 and 26) to prevent the connector 408 from being removed from the network interface device 300.

In general, the shroud 317 includes left and right side sections 317b, 317c, respectively, extending rearwardly of a front section 317a (FIG. 17). The top, bottom, and rear of the shroud 317 are open. The front section 317a and side sections 317b, 317c define a channel 317d in which the connector 408 and the second end 404 of the adapter 400 can be arranged. The shroud 317 extends downwardly a sufficient distance and the sides 317b, 317c wrap sufficiently around the connector 408 to inhibit access to the grip portion 412 of the connector 408.

In use, the rotatable grip portion 412 of the connector 408 can be accessed when the cover 315 is arranged in the open position. The connector 408 of the incoming cable 201 can be inserted into or removed from the adapter 400 by twisting the accessed grip portion 412 of the connector 408 to unthread the connector 408. When the cover 315 is arranged in the closed position, however, access to the grip portion 412 is blocked by the shroud 317 of the cover 315.

Further details describing one exemplary embodiment of an optical adapter, such as adapter 400, can be found in U.S. Pat. No. 6,579,014, issued Jun. 17, 2003, and entitled "FIBER OPTIC RECEPTACLE," the disclosure of which is hereby incorporated by reference. Further details describing one exemplary embodiment of a fiber optic connector, such as connector 408, can be found in U.S. Pat. No. 6,648,520, issued Nov. 18, 2003, and entitled "FIBER OPTIC PLUG," the disclosure of which is hereby incorporated by reference.

As shown in FIG. 25, the sidewall 301 of the network interface device 300 also defines openings through which the outgoing cables, such as the hybrid cable 230 (FIG. 2), extend. In an embodiment, the bottom wall 306 defines a second opening 364 through which the outgoing hybrid cable 230 can extend, at least one opening 366 through which the second coaxial cable 250 can extend, and at least one opening 368 through which the second twisted pair cable 260 can extend. In the example shown in FIG. 25, the bottom wall 306 defines two openings 366 for the second coaxial cable 250 and two openings 368 for the second twisted pair cable 260.

Alternatively, as shown in FIG. 33, an optical coupling location 342' can be located within the forward interior 321. For example, a shelf 340' arranged within the forward interior 321 can define both a slot or opening for the coaxial cable adapter 500 and a slot or opening through which the fiber optic adapter 400 can be mounted. In such embodiments, the flange 367 also extends over the opening 362 in the bottom wall 306 through which the incoming fiber 201 extends. The gasket (not shown) also extends over and provides a protective barrier at the opening 362. In such embodiments, a protective shroud 317 (FIG. 25) does not extend from the cover 315 to limit access to the fiber optic connector 408. Rather, the adapter 400 and the connector 408 are positioned within the forward interior 321 and protected by the surface 314 of the cover 315.

In the example shown in FIG. 9, a flange 367 extends forwardly of the base wall 302 above the bottom wall 306 to provide a pocket 369 between the bottom wall 306 and the flange 367. A gasket (e.g., foam) can be inserted within the pocket 369 to provide a water, dust, and insect barrier to protect the telecommunications components within the forward interior 321. The flange 367 defines slots or openings aligned with the openings 366, 368 in the bottom wall 306 to enable the outgoing cables to reach and extend through the openings 366, 368 in the bottom wall 306.

The forward interior 321 also includes a cable management arrangement around which the telecommunications cables 232, 233, 234 of the hybrid cable 230 can be routed. For example, as shown in FIG. 9, the cable management arrangement can include a fiber spool 352 around which excess cable (i.e., slack) of the hybrid cable 230 can be stored. The cable management arrangement also can include a bend radius limiter 354 configured to route the hybrid cable 230 from the opening 364 in the sidewall 301 to the coupling locations 342, 344, 346 within the body 310.

Figure 28:
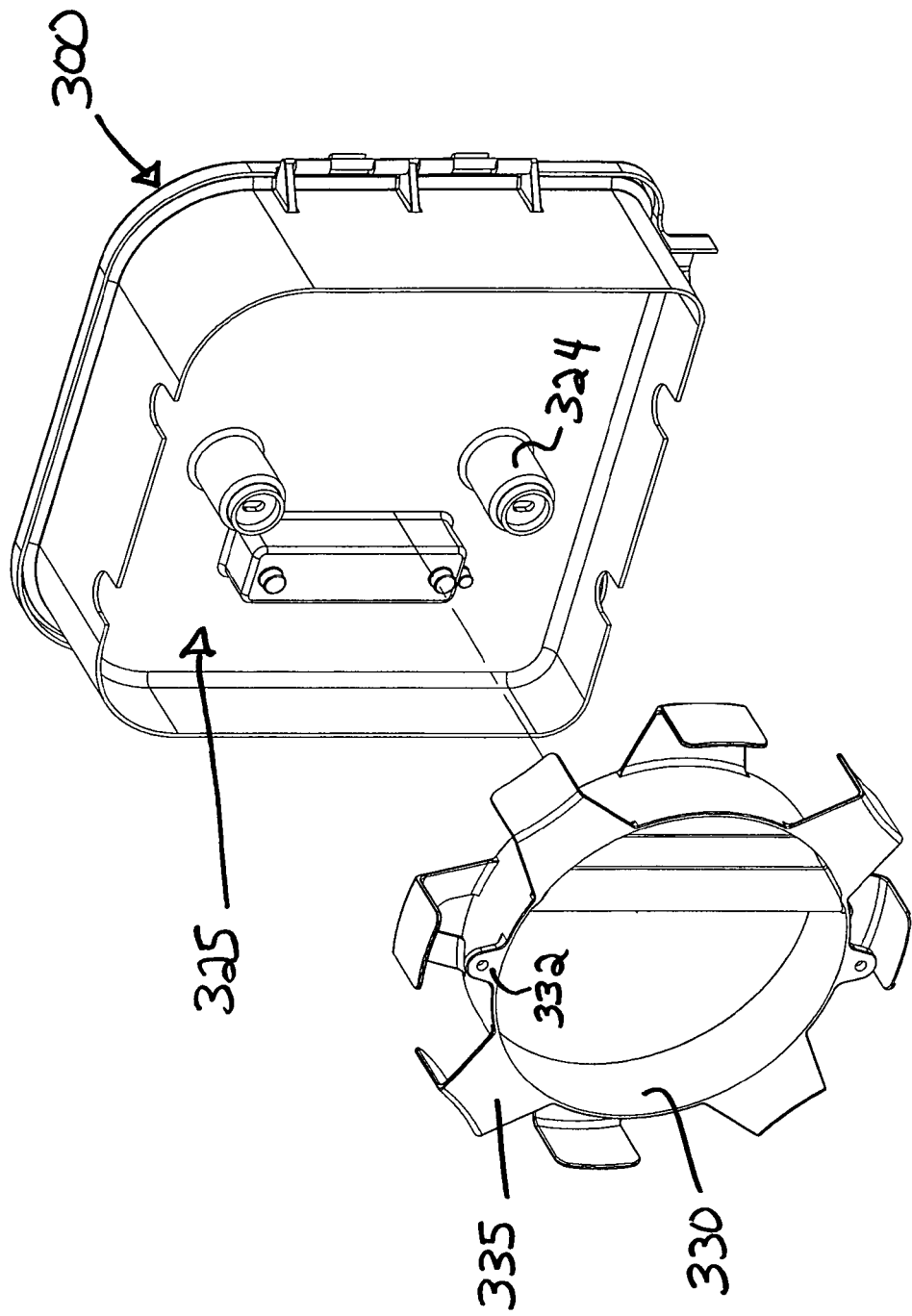
FIG. 28 is a rear, perspective view of the NID and the cable spool of FIG. 27.
Figure 29:
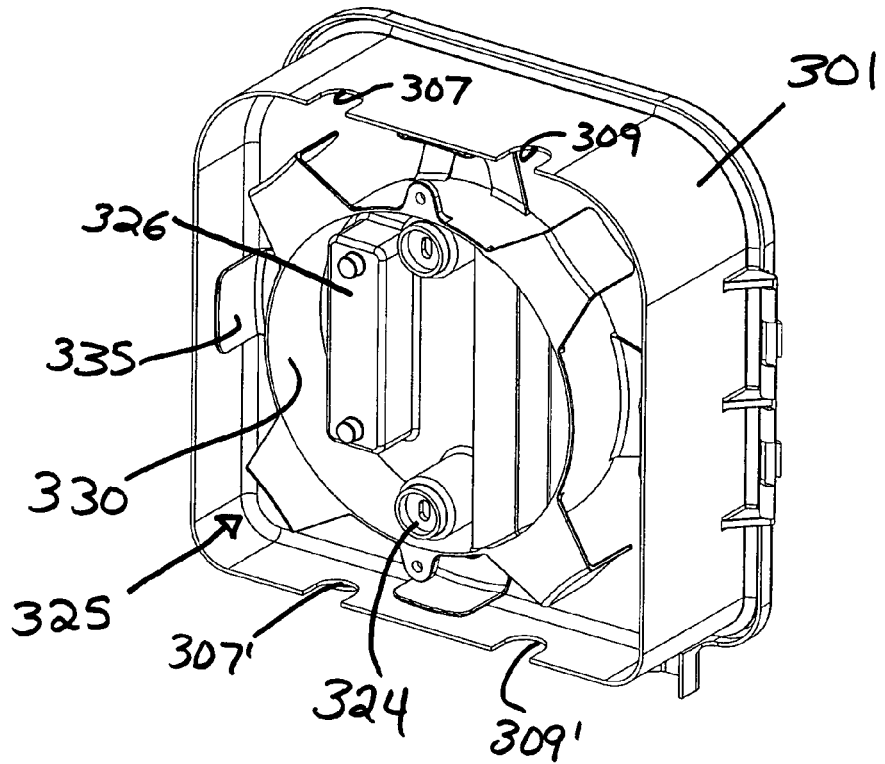
FIG. 29 is a rear, perspective view of the NID of FIG. 3 with a cable spool mounted within a rearward pocket of the NID.

Referring to FIGS. 28-32, the sidewall 301 can extend rearwardly of the base wall 302 to provide a rearward interior (i.e., or pocket) 325 (FIG. 28). A cable spool 330 can be removably coupled to the rear of the base wall 302 within the rearward interior 325 of the body 310. The spool 330 is configured to enable excess fiber cable, such as incoming fiber cable 201, to be wound and stored within the rearward pocket 325 of the network interface device 300.

The sidewall 301 surrounds the wound cable to aid in retaining the cable on the spool 330 and to hide the cable from sight. The sidewall 301 can define an ingress and an egress into and out of the rearward pocket 325 for the excess cable. For example, in FIG. 29, the top wall 304 of the sidewall 301 defines a first slot 307 and a second slot 309 through which the excess cable can enter and exit the rearward pocket 325. The bottom wall 306 also can define slots 307' and 309' (FIG. 29) through which the excess cable can enter and/or exit the rearward pocket 325.

Figure 32:
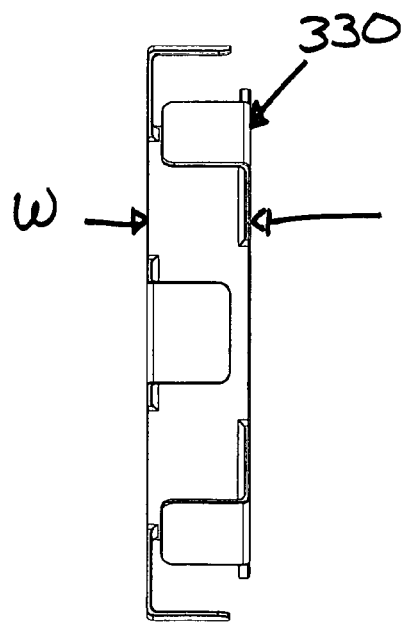
FIGS. 30-32 illustrate different views of an exemplary cable spool in accordance with the principles of the present invention.
Figure 30:
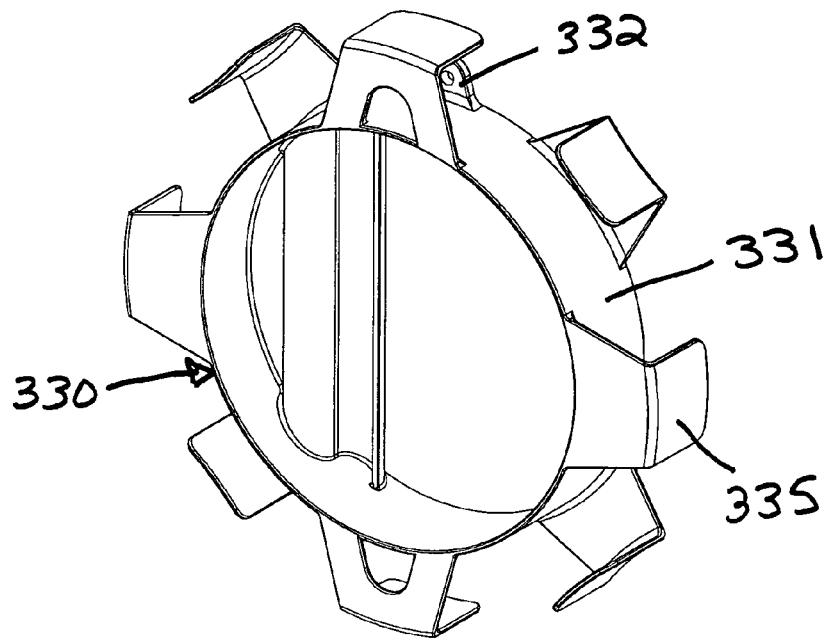
Figure 31:
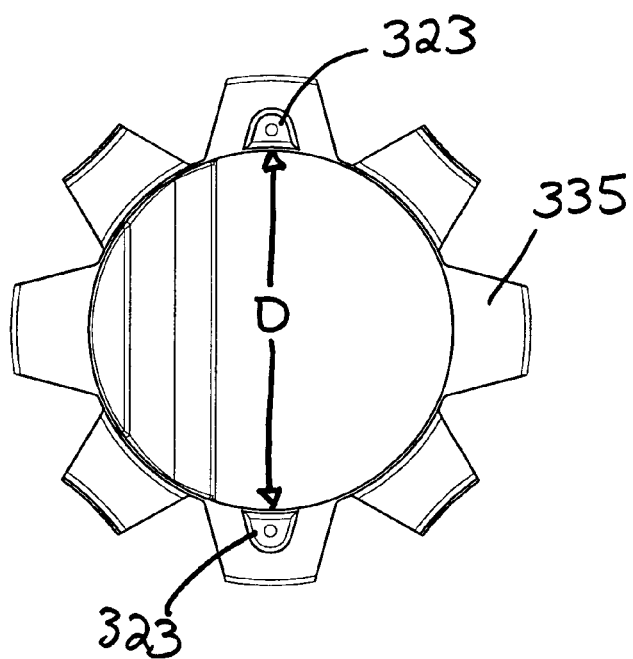

The spool 330 includes a loop 331 (FIG. 30) and can include cable retention tabs 335 extending from the loop 331 to aid in retaining the cable on the spool 330. In the example shown, the cable retention tabs 335 extend from front and rear sides of the loop 331. The spool 330 has a diameter D (FIG. 31) and a width W (FIG. 32). Generally, the spool 330 is sized to fit within the rearward pocket 325 of the body 310. For example, the spool 330 can have a diameter of about four to ten inches and a width of up to about two inches.

In use, the spool 330 can be removed from the rearward pocket 325 of the body 310. The incoming fiber cable 201 is routed to the body 310. Excess length of the cable 201 is wrapped around the spool 330 and the spool 330 is returned to the rearward pocket 325. In an embodiment, the spool 330 is loosely mounted within the pocket, for example, with a snap-fit connection. In another embodiment, the spool 330 is securely mounted within the pocket, for example, with fasteners. The network interface device 300 with the spool 330 and the excess cable can be mounted to a surface.

Alternatively, the spool 330 can include mounting tabs 332 by which the spool 330 can be mounted to the surface separate from the body 310 (e.g., a wall or other structure provided at the subscriber location). The rearward interior 325 of the body 310 can then be aligned with the spool 330 and the body 310 can be mounted to the surface over the spool 330 to enclose the wound cable within the rearward pocket 325. The connectorized end of the incoming cable 201 is routed to the optical coupling location 342.

Attachment members 324 extend rearwardly from the base wall 302 to facilitate mounting the body 310 to the surface, such as an outer wall of a subscriber premises 115 (FIG. 1). In certain embodiments, the attachment members 324 are configured to enable the body 310 to be screwed or otherwise fastened to a surface. In the example shown in FIG. 4, the attachment members 324 are generally cylindrically shaped. In an embodiment, the attachment members 324 extend rearwardly a distance of generally equal to or greater than the width W of the cable management spool 330 (e.g., see FIG. 29).

Referring now to FIGS. 34-77, a third example embodiment 700 of a network interface device 210 having features that are examples of inventive aspects in accordance with the present disclosure is shown. The example network interface device 700 includes a body 710, a cover 715, and a removable sidewall arrangement 707 (see FIGS. 59 and 60). A cable spool 730 extends rearwardly from the body 710. The sidewall arrangement 707, which will be discussed in greater detail herein, couples to the body 710 to cover the cable spool 730.

Figure 47:
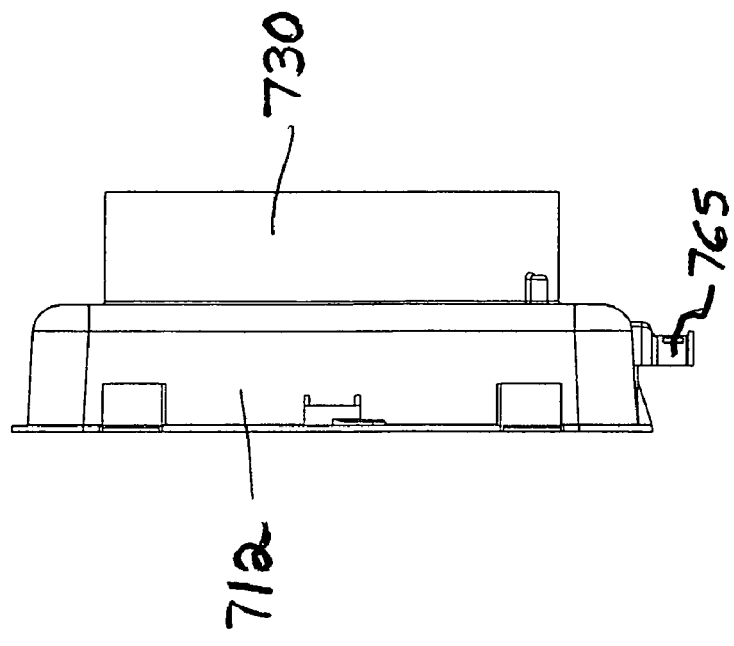
FIG. 47 is a right side view of the body of FIG. 41.
Figure 46:
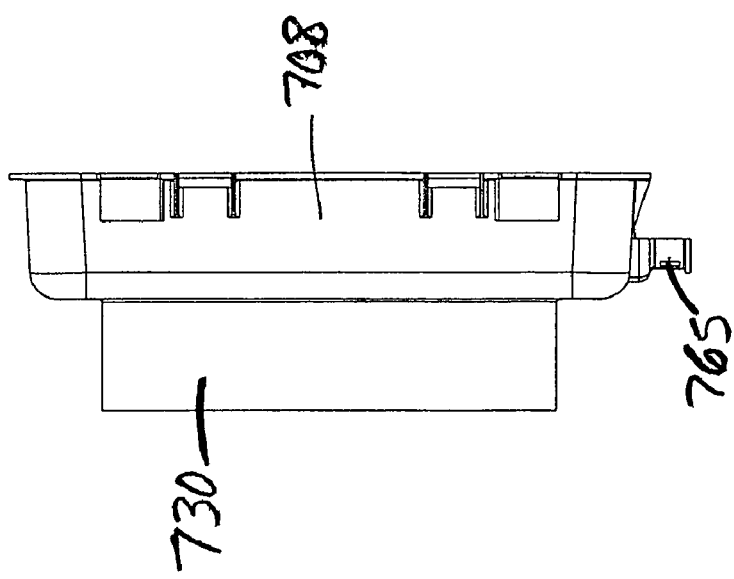
FIG. 46 is a left side view of the body of FIG. 41.
Figure 48:
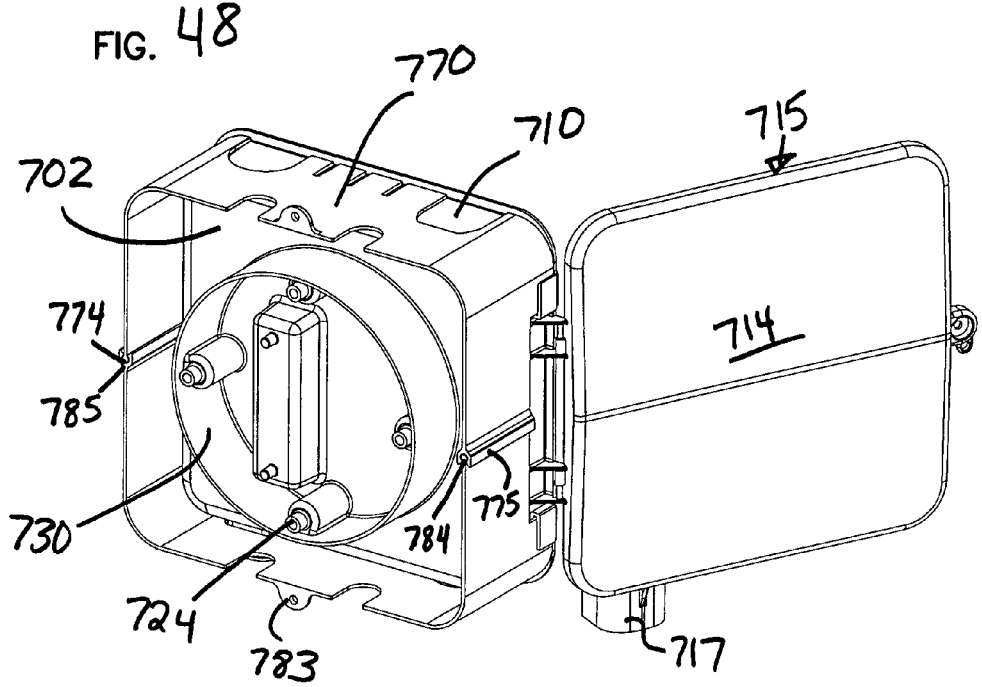
FIG. 48 is a rear perspective view of the second NID of FIG. 34 with the cover arranged in an open position.

The body 710 (FIG. 41) has a top wall 704 (FIG. 44), a bottom wall 706 (FIG. 45), a first side wall 708 (FIG. 46), and a second side wall 712 (FIG. 47). The top wall 704, bottom wall 706, first side wall 708, and second side wall 712 generally extend forwardly from a base wall 702 to form a forward interior 721 (FIG. 41) in which telecommunications components can be arranged. The forward interior 721 of the example network interface device 700 is substantially similar to forward interior 321 of network interface device 300 disclosed above.

Figure 49:
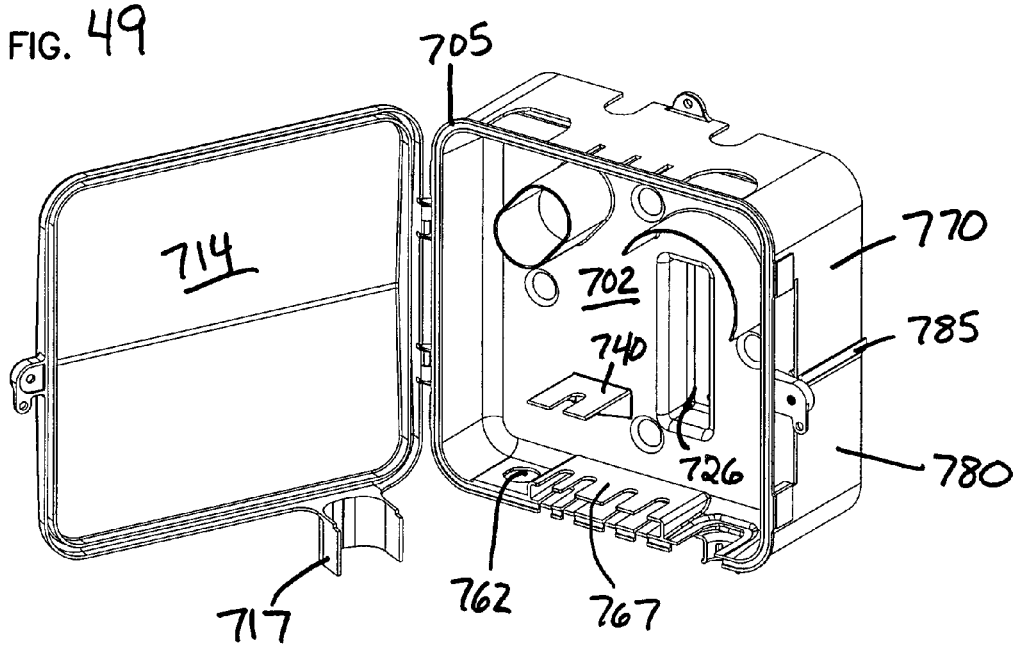
FIG. 49 is a front, perspective view of the second NID of FIG. 48.
Figure 50:
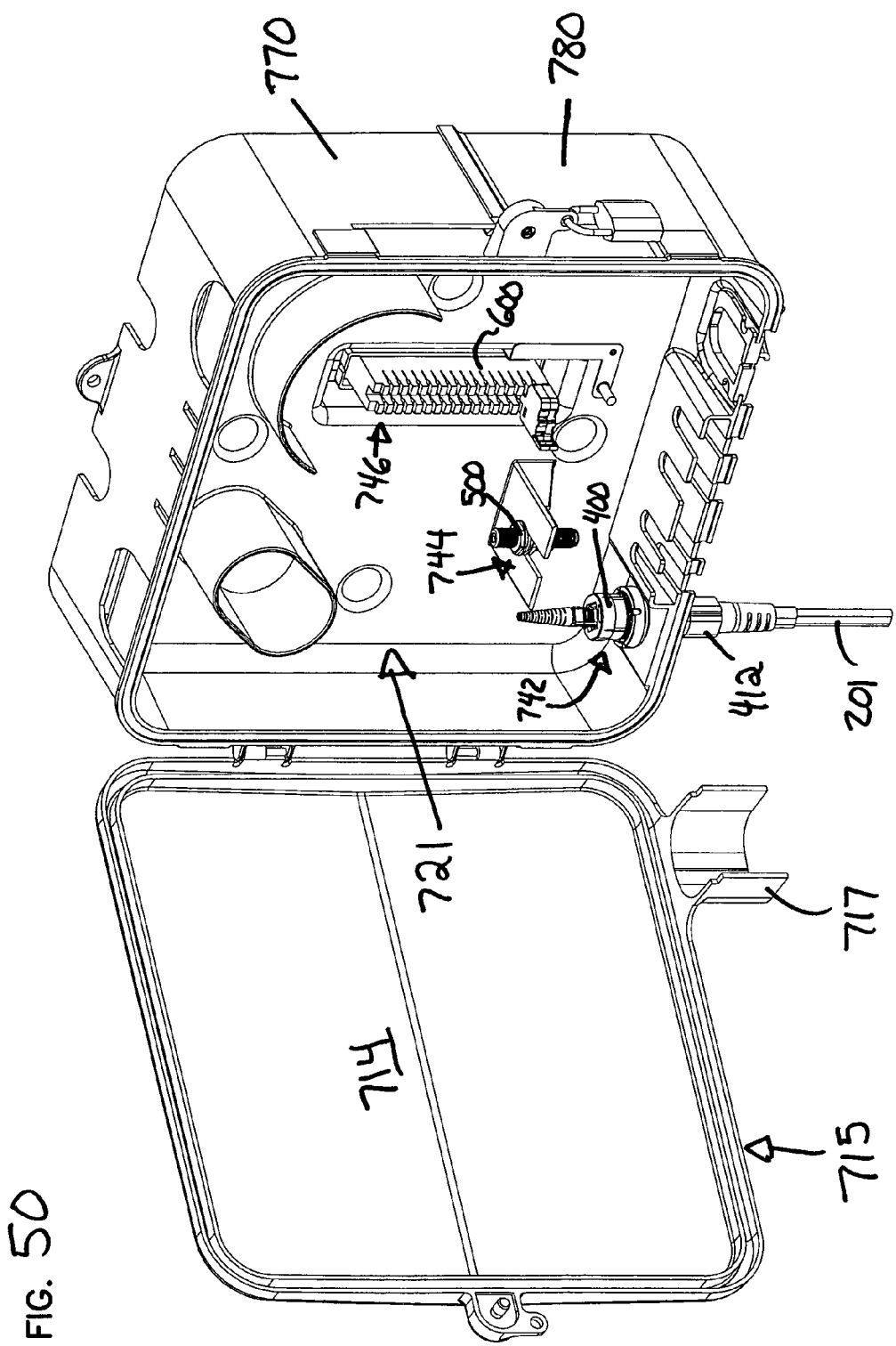
FIG. 50 is a front, perspective view of the second NID of FIG. 48 with telecommunication components arranged within a forward interior of the second NID.
Figure 51:
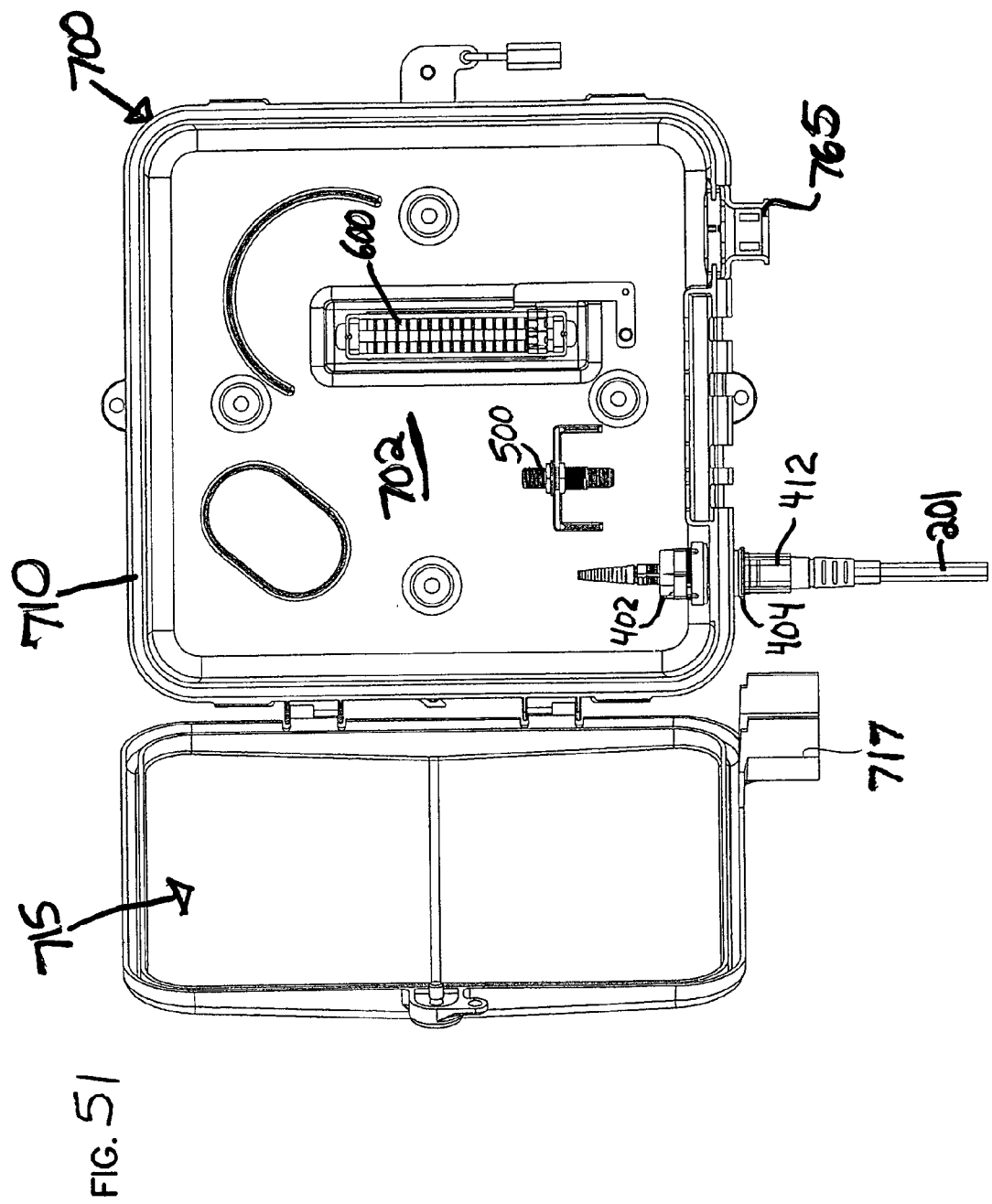
FIG. 51 is a front view of the second NID of FIG. 50.
Figure 52:
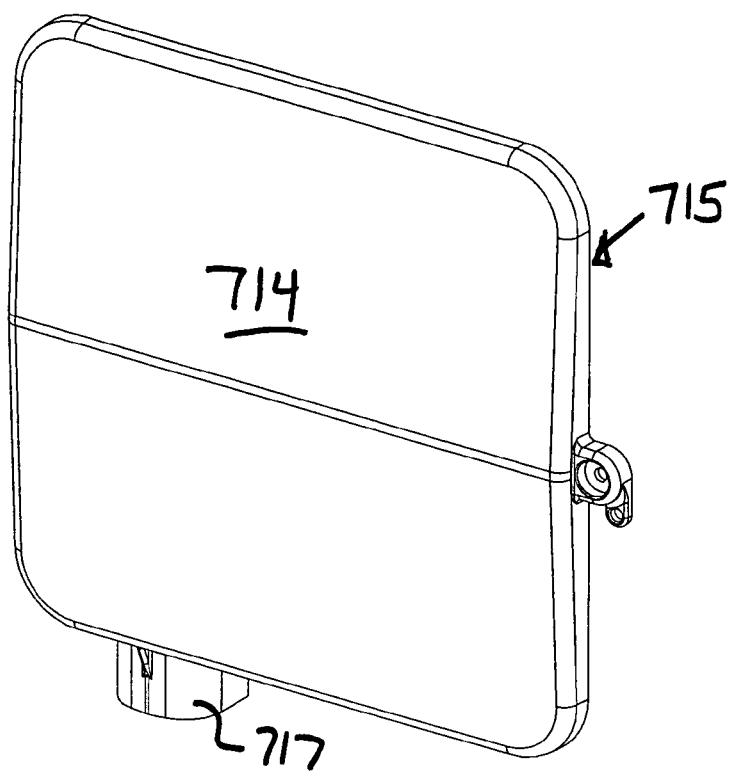
FIG. 52 is a front, perspective view of the cover of FIG. 34.
Figure 53:
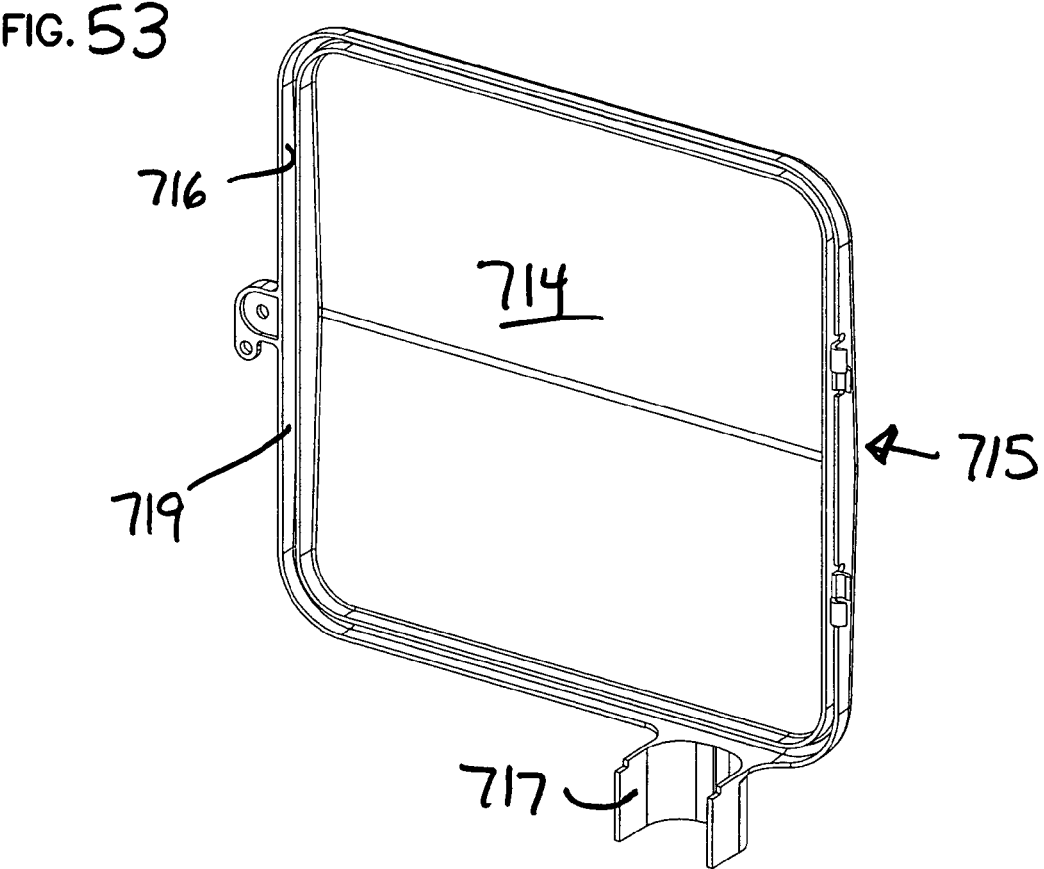
FIG. 53 is a rear, perspective view of the cover of FIG. 34.
Figure 55:
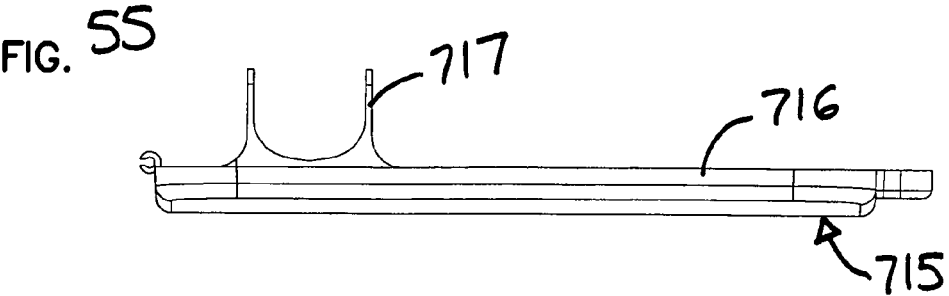
FIG. 55 is a top view of the cover of FIG. 34.
Figure 54:
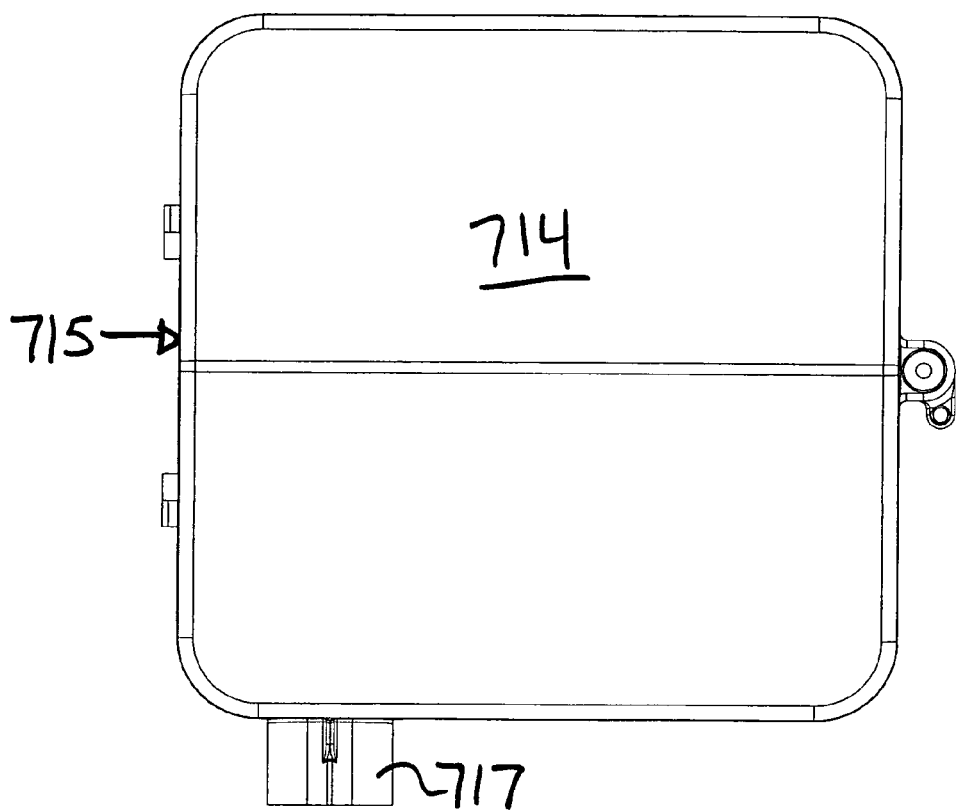
FIG. 54 is a front view of the cover of FIG. 34.
Figure 56:
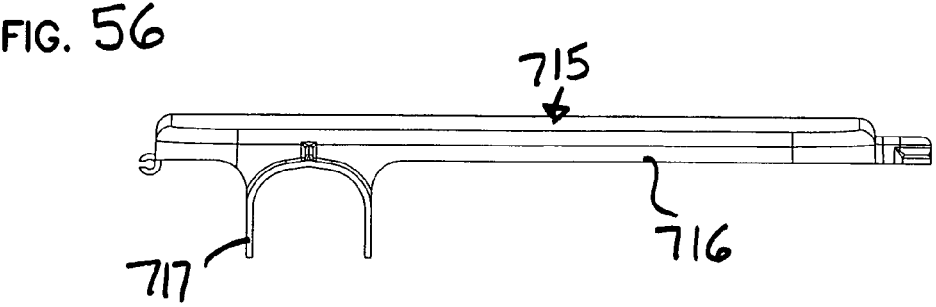
FIG. 56 is a bottom view of the cover of FIG. 34.
Figure 58:
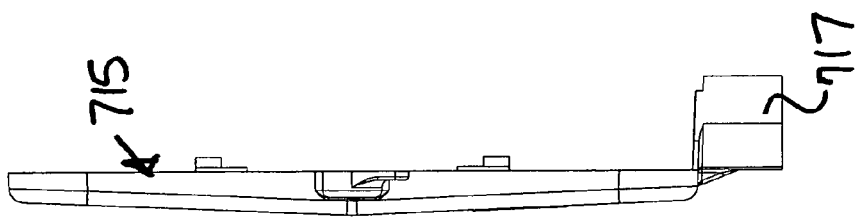
FIG. 58 is a right side view of the cover of FIG. 34.
Figure 57:
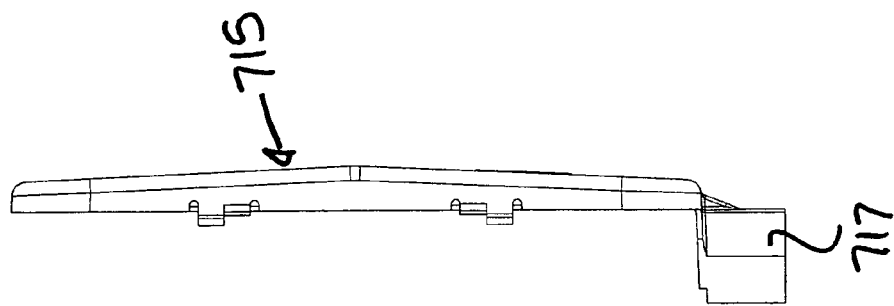
FIG. 57 is a left side view of the cover of FIG. 34.
Figure 61:
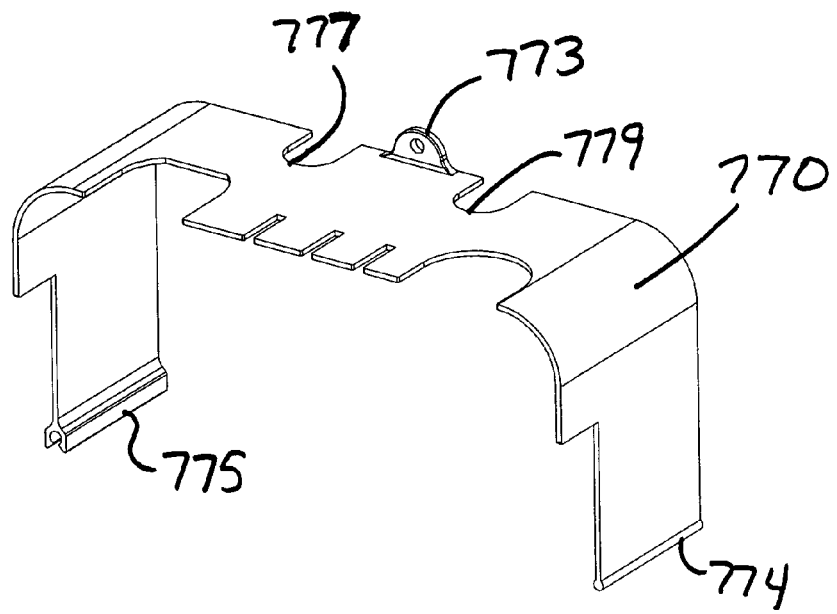
FIGS. 61-67 illustrate different views of an exemplary sidewall of the sidewall arrangement of FIG. 34 in accordance with the principles of the present disclosure.
Figure 62:
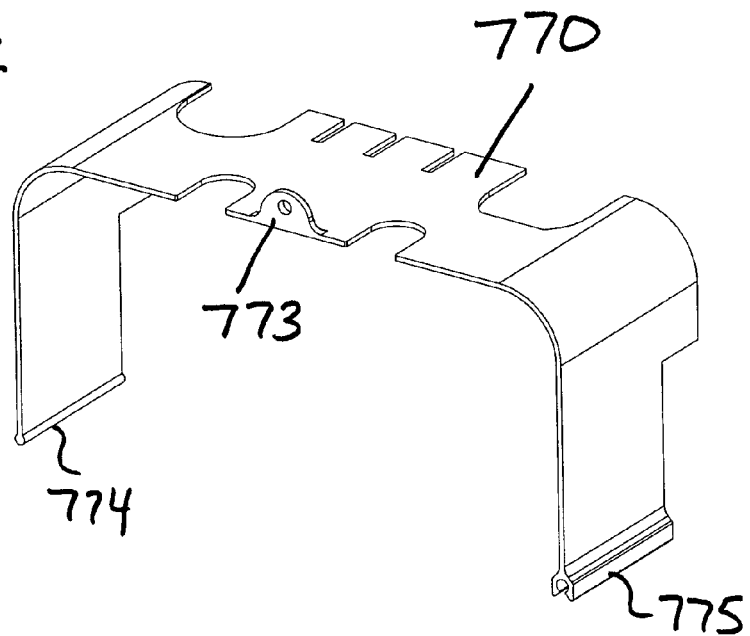
Figure 64:
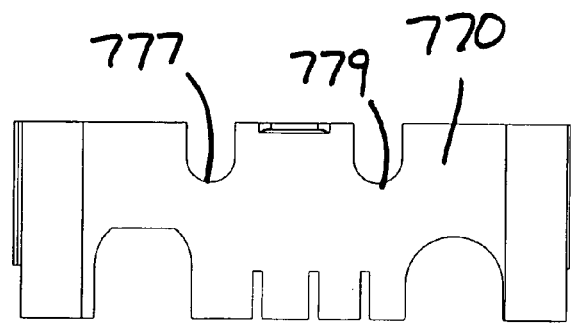
Figure 63:
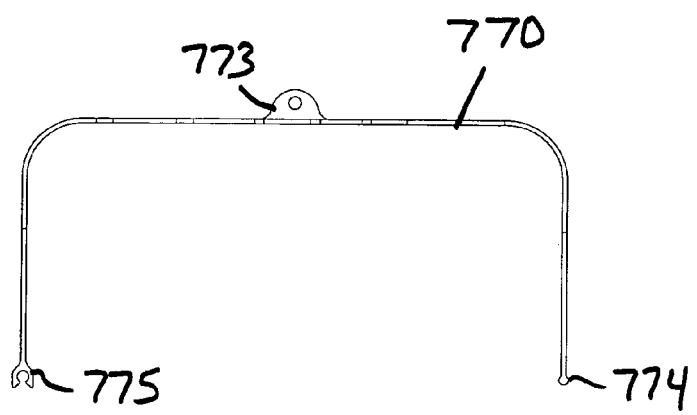
Figure 65:
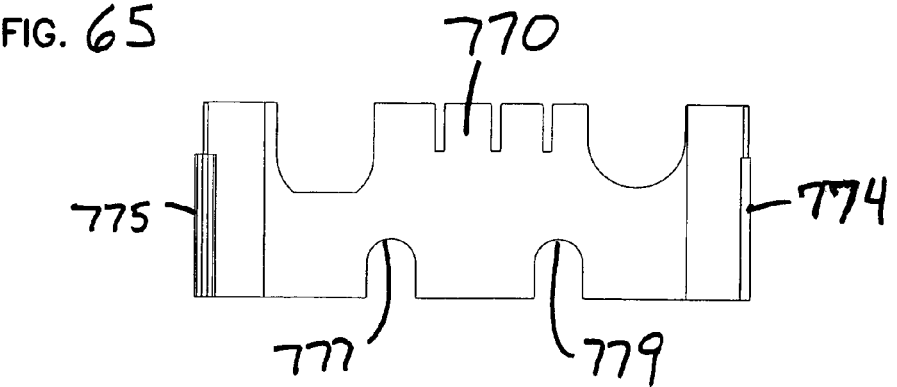
Figure 67:
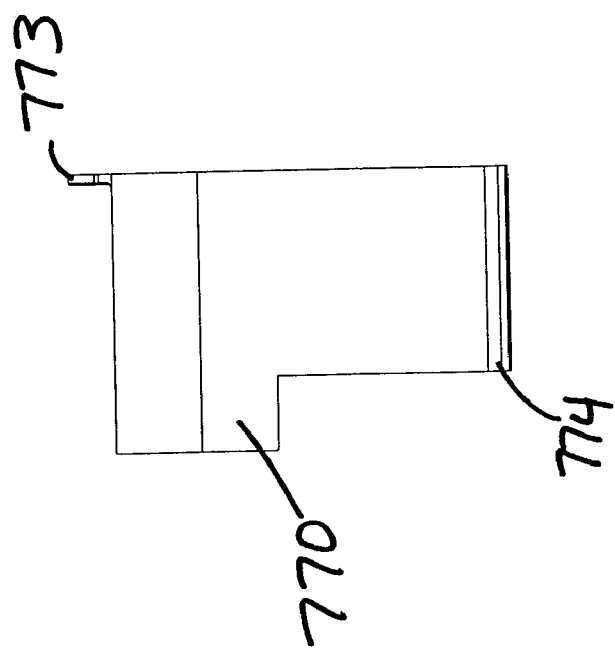
Figure 66:
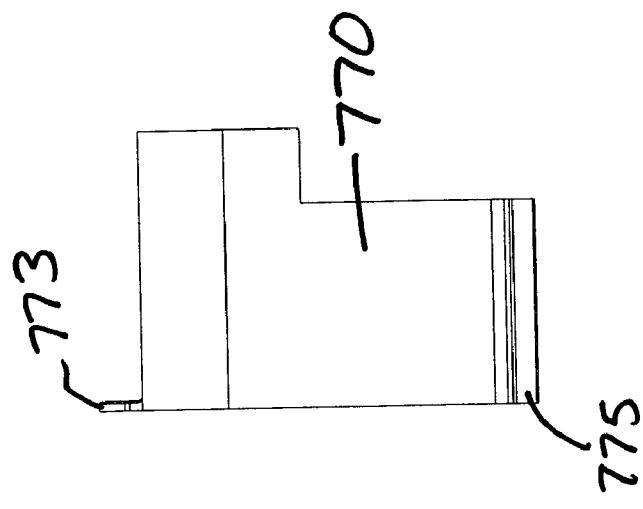

As shown in FIG. 49, an optical coupling location 742 is arranged at a first opening 762 defined in the bottom wall 706 of the body 710. A fiber optic adapter 400 extending from a first end 402 to a second end 404 is mounted in the first opening 762. The first end 402 is positioned within the interior 721 of the body 710 and the second end 404 of the fiber optic adapter 400 is positioned exterior of the body 710 (e.g., see FIG. 50).

Figure 45:
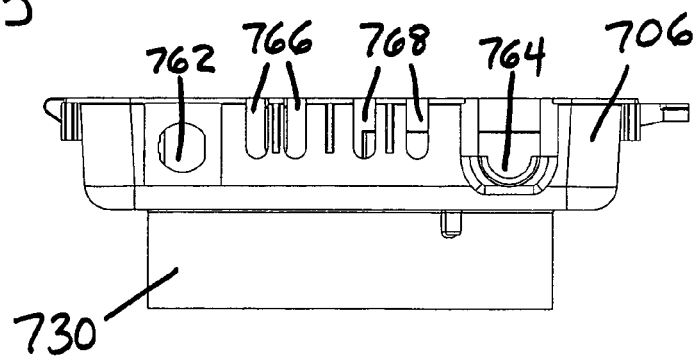
FIG. 45 is a bottom view of the body of FIG. 41.

The sidewall 701 of the network interface device 700 also defines openings through which the outgoing cables, such as the hybrid cable 230 (FIG. 2), extend. In an embodiment, the bottom wall 706 defines a second opening 764 through which the outgoing hybrid cable 230 can extend, at least one opening 766 through which the second coaxial cable 250 can extend, and at least one opening 768 through which the second twisted pair cable 260 can extend (FIG. 45). In the example shown in FIG. 45, the bottom wall 706 defines two openings 766 for the second coaxial cable 250 and two openings 768 for the second twisted pair cable 260.

Figure 34:
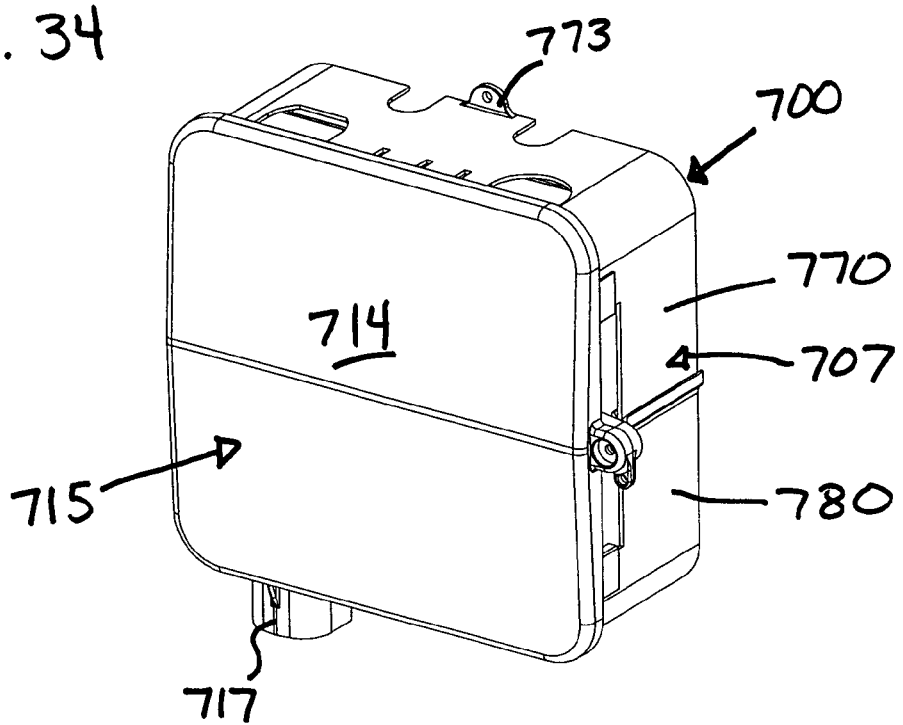
FIG. 34 illustrates a front, perspective view of a second embodiment of a NID having features that are examples of inventive aspects in accordance with the principles of the present invention, the second network interface device having a body, a cover, and a sidewall arrangement.
Figure 35:
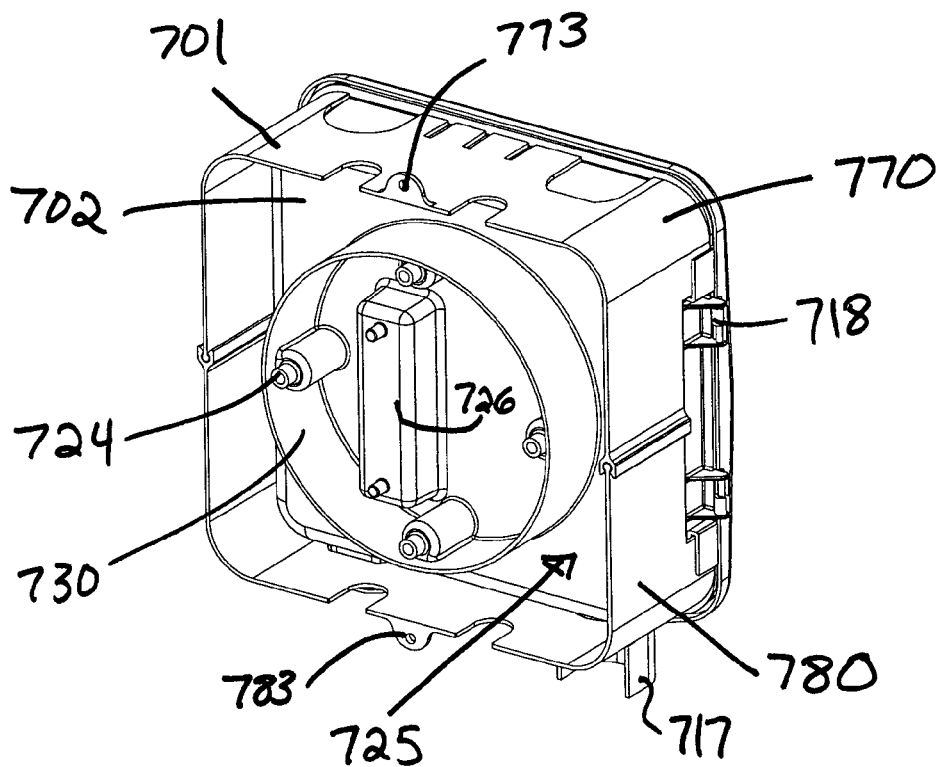
FIG. 35 is a rear, perspective view of the NID of FIG. 34.
Figure 37:
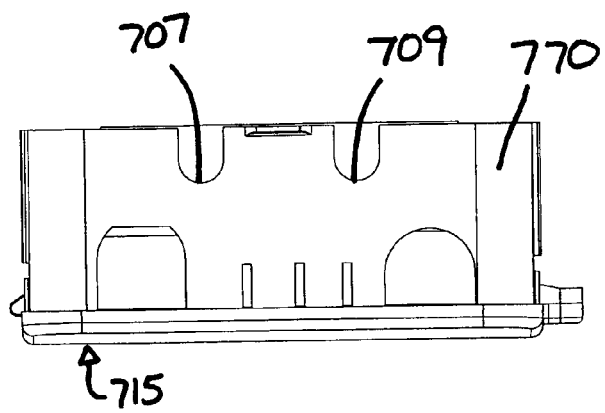
FIG. 37 is a top view of the NID of FIG. 34.
Figure 36:
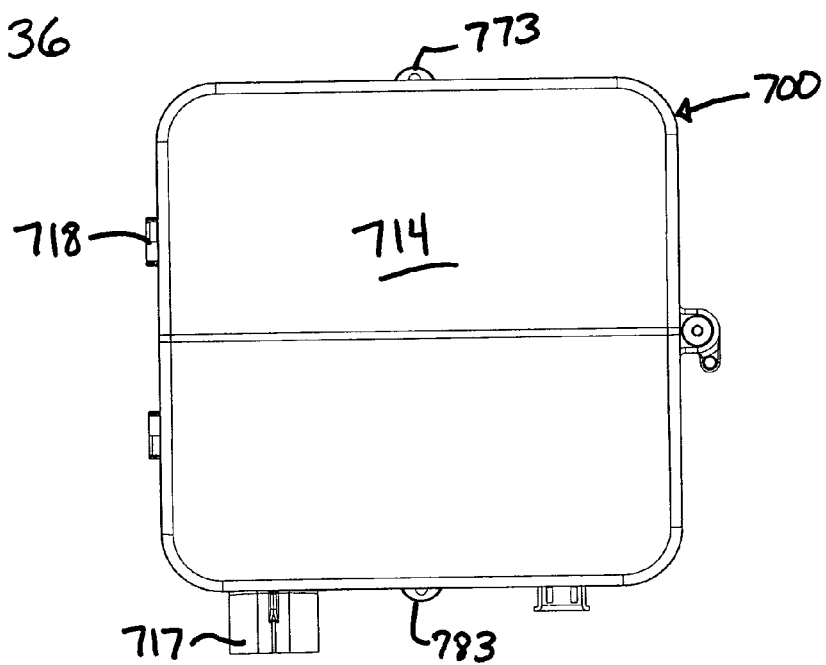
FIG. 36 is a front view of the NID of FIG. 34.
Figure 38:
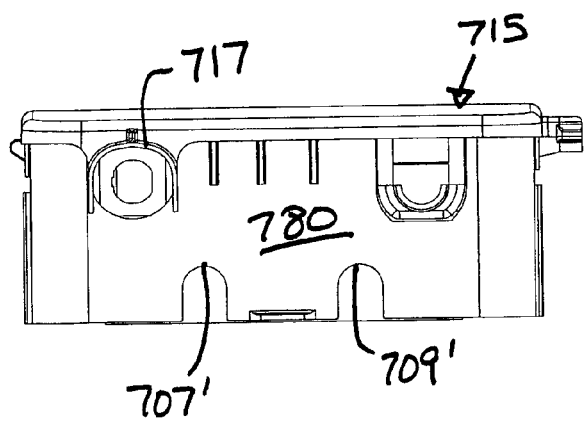
FIG. 38 is a bottom view of the NID of FIG. 34.

As shown in FIG. 34, a cover 315 (FIGS. 52-58) can be pivotally mounted to the body 710 to protect the telecommunication components arranged within the forward interior 721 of the body 710. For example, the cover 715 can be mounted to the body 710 with hinges 718 (FIG. 35). The cover 715 includes a front panel 714 from which a sidewall 716 extends rearwardly.

The sidewall 716 can define a channel 719 (FIG. 53) in which a gasket (e.g., foam) can be arranged. The gasket (not shown) provides a seal between the cover 715 and the body 710 to protect the components within the forward interior 721 of the body 710 from environmental conditions. The gasket also can be arranged on a ledge 705 (FIG. 49) extending parallel with the base wall 702 from the perimeter of the body 710.

The cover 715 includes a protective shroud 717 (FIG. 53) extending downwardly from the cover 715. The protective shroud 717 is positioned adjacent the optical coupling location 742 when the cover 715 is mounted to the body 710 and arranged in the closed position. The shroud 717 is configured to cover the grip portion 412 of the fiber optic connector 408 of the incoming fiber 201 similar to shroud 317 described above. Typically, the shroud 717 covers the second end 404 to limit access to the adapter 400. In a preferred embodiment, the shroud 717 wraps a sufficient distance around the connector 408 to inhibit a user's ability to access, insert, and/or remove the connector 408.

Attachment members 724 (FIG. 59) extend rearwardly from the base wall 702 to facilitate mounting the body 710 to a surface, such as an outer wall of a subscriber premises 115 (FIG. 1). In certain embodiments, the attachment members 724 are configured to enable the body 710 to be screwed or otherwise fastened to the surface. In the example shown in FIG. 59, the attachment members 724 are generally cylindrically shaped.

Referring to FIGS. 59-67, a cable spool 730 extends rearwardly from the base wall 702. The spool 730 is configured to receive excess cable, such as incoming fiber cable 201, for storage of the excess cable. The cable spool 730 can be either fixedly mounted or removably mounted to the body 710. In the example shown in FIG. 60, the spool encircles the attachment members 724 and is integrally formed with the base wall 702.

A sidewall arrangement 707 (FIGS. 34 and 56) surrounds the cable spool 730 to aid in retaining cable wound on the spool 330 and to hide the wound cable from sight. The sidewall arrangement 707 includes a first sidewall 770 and a second sidewall 780 (FIG. 59). In the example shown, the first sidewall 770 is an upper sidewall and the second sidewall 780 is a lower sidewall (FIG. 59). Each sidewall 770, 780 is generally U-shaped, having a primary surface extending across one side of the body 710 and two secondary surfaces each extending from the primary surface along a portion of one side of the body 710 (FIG. 35).

Figure 40:
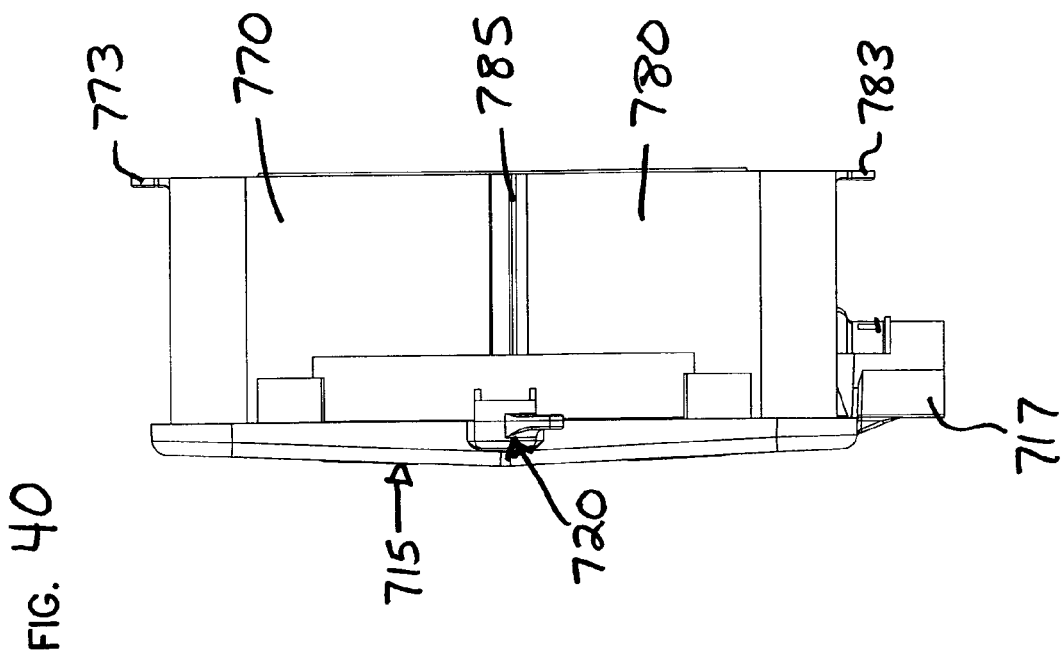
FIG. 40 is a right side view of the NID of FIG. 34.
Figure 39:
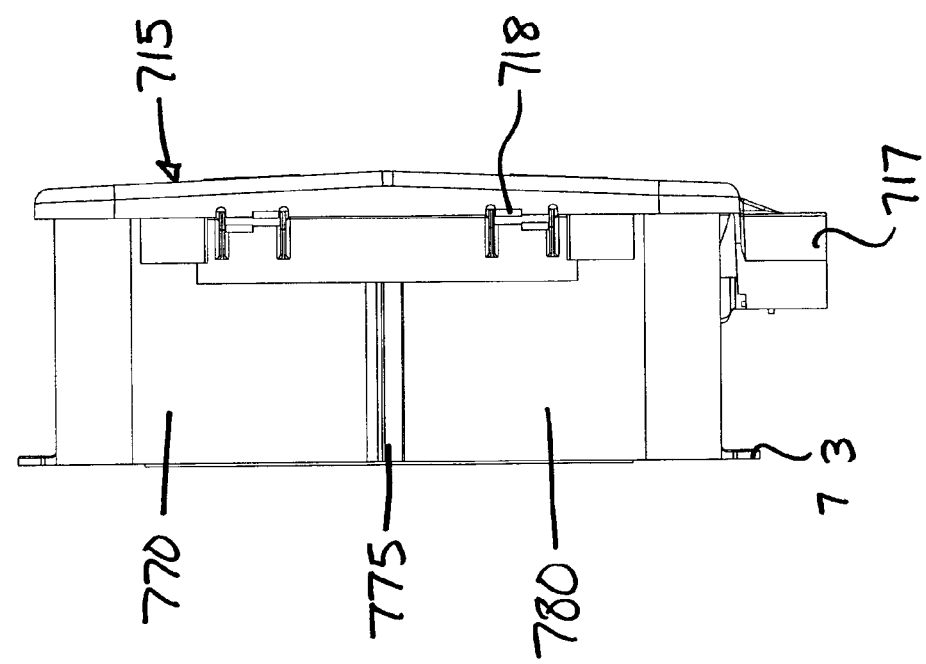
FIG. 39 is a left side view of the NID of FIG. 34.
Figure 41:
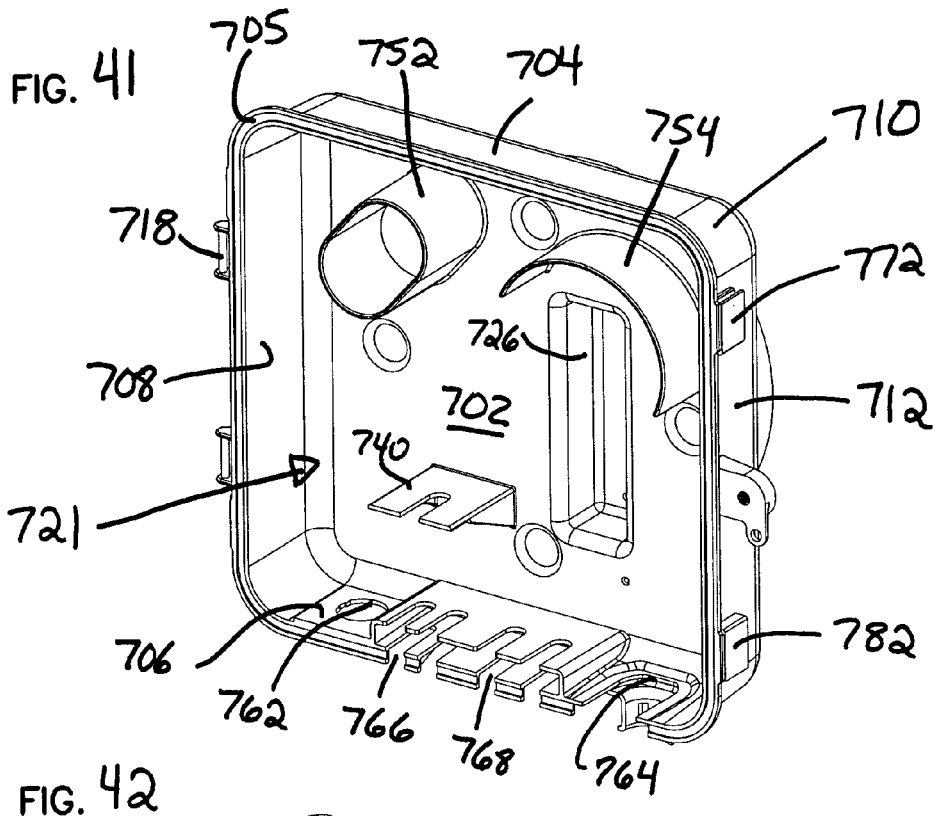
FIG. 41 is a front, perspective view of the body of the NID of FIG. 34 with the cover and the sidewall arrangement removed.
Figure 42:
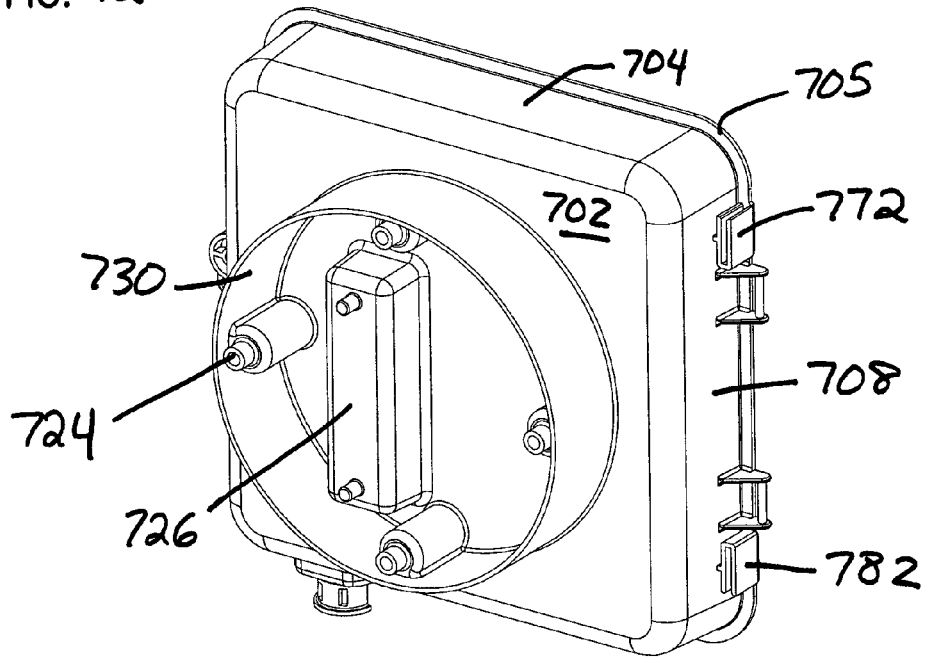
FIG. 42 is the rear, perspective view of the body of FIG. 41.
Figure 44:
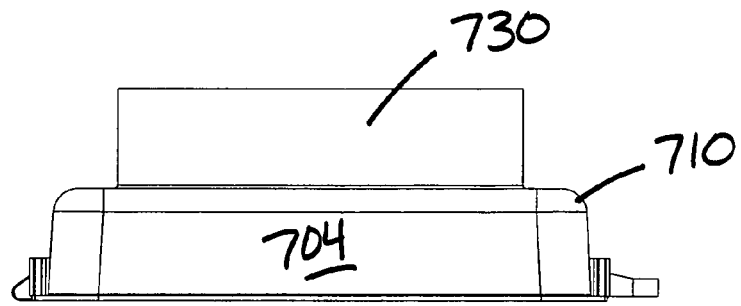
FIG. 44 is a top view of the body of FIG. 41.
Figure 43:
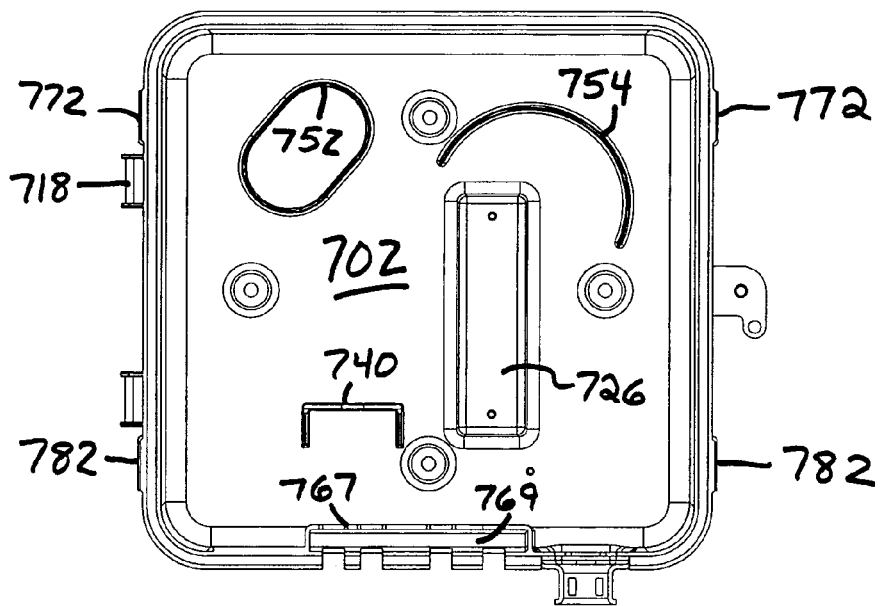
FIG. 43 is a front view of the body of FIG. 41.

The sidewalls 770, 780 of the sidewall arrangement 707 are configured to mount to the body 710 to form a rearward pocket 725 (FIG. 35) around the spool 730. For example, the sidewalls 770, 780 can engage (e.g., slide into) tabs 772, 782 on the body 710 to securely mount to the body 710. The sidewalls 770, 780 also can secure to each other. In the example shown in FIGS. 59-60, sidewall 770 includes an insertion end 774 and a receiving end 775 and sidewall 780 includes an insertion end 784 and a receiving end 785. The receiving end 775 of sidewall 770 receives the insertion end 784 of sidewall 780 (FIG. 39). The receiving end 785 of sidewall 780 receives the insertion end 775 of sidewall 770 (FIG. 40).

The sidewalls 770, 780 of the sidewall arrangement 707 each can define an ingress and an egress into and out of the rearward pocket 725. For example, in FIG. 61, the sidewall 770 defines a first slot 777 and a second slot 779 through which a cable can enter and exit the rearward pocket 725. The sidewall 780 also can define slots 787 and 789 through which the excess cable can enter and/or exit the rearward pocket 725 (FIG. 59).

In use, the body 710 of the network interface device 700 is mounted to a surface without the sidewall arrangement 707. The incoming fiber cable 201 is routed to the body 710. Excess length of the cable 201 is wrapped around the spool 730 between the surface and the base panel 702. The sidewall arrangement 707 is then mounted to (e.g., slid onto) the body 710 around the wound cable. The cable 201 is arranged to fit within the ingress and egress slots 777, 779. The sidewall arrangement 707 hides the wound cable from sight. The sidewall arrangement 707 also can aid in retaining a stiff cable on the spool 730. The connectorized end of the incoming cable 201 is routed to the optical coupling location 742.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while the network interface device described above houses optical, coaxial, and twisted pair cabling components, the network interface device may include only optical or only electrical components in other implementations consistent with the invention.

For example, implementations consistent with the principles of the invention can be implemented using connectors, receptacles, cable coupling techniques and methods other than those illustrated in the figures and described in the specification without departing from the spirit of the invention. Furthermore, additional events can be added, or removed, depending on specific deployments, applications, and the needs of users and/or service providers.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A network interface device, comprising:
a body having a front and a rear, the front of the body defining a forward interior in which telecommunications components are arranged, the rear of the body being configured to mount to a surface, the rear of the body also defining a rearward pocket; and
a cable spool configured to removably mount within the rearward pocket of the body, the cable spool being configured to receive excess length of a fiber cable in a wrap configuration;
wherein the rearward pocket is formed from at least one sidewall that encloses the cable spool and any excess length of cable wrapped around the cable spool when the cable spool is mounted within the rearward pocket; and
wherein the cable spool is configured to be mounted to the surface separate from the body.

2. The network interface device of claim 1, wherein the excess length of the fiber cable is wrapped around the cable spool before mounting the cable spool to the surface.

3. The network interface device of claim 1, wherein the body is mounted to the surface over the cable spool and any fiber cable wrapped around the cable spool.

4. The network interface device of claim 1, wherein the at least one sidewall is integrally formed with the body.

5. The network interface device of claim 1, wherein the at least one sidewall defines an ingress into and an egress out from the rearward pocket for the fiber cable.

6. A network interface device, comprising:
a body including a base wall and at least one side wall defining a forward interior in which telecommunications components are arranged, the at least one side wall of the body defining an optical coupling location;
a fiber optic adapter extending from a first end to a second end, the fiber optic adapter configured to mount at the optical coupling location defined in the side wall of the body so that the first end of the fiber optic adapter defines a first port for receiving a first fiber optic connector from inside the body and the second end of the fiber optic adapter defines a second port for receiving a second fiber optic connector from outside the body; and
a cover mounted to the body opposite the base wall, the cover being movable from a first position in which the cover closes the forward interior of the body, to a second position in which the cover provides access to the forward interior of the body, the cover including a shroud configured to extend over the second fiber optic connector when the second fiber optic connector is received within the second port of the second end of the fiber optic adapter and when the cover is arranged in the first position, the shroud further being configured to inhibit access to the second fiber optic connector when the cover is arranged in the first position.

7. The network interface device of claim 6, further comprising a first optical cable terminated at the second fiber optic connector.

8. The network interface device of claim 7, further comprising a second optical cable extending from a first end to a second end, the second end configured to couple to telecommunications equipment, the first end terminated at the first fiber optic connector, the fiber optic adapter being configured to optically couple the first fiber optic connector to the second fiber optic connector.

9. The network interface device of claim 8, wherein the telecommunications equipment is a conversion box in which an optical signal carried by the second optical cable can be changed to an electrical signal.

10. The network interface device of claim 7, further comprising a hybrid cable including a cable jacket enclosing a second optical cable, a coaxial cable, and a twisted pair cable, the hybrid cable extending from a first end positioned within the forward interior of the body to a second, opposite end positioned external of the body.

11. The network interface device of claim 10, further comprising:
a coaxial cable adapter provided within the forward interior of the body at a coaxial coupling location, the coaxial cable adapter being configured to electrically couple the coaxial cable of the hybrid cable with an outgoing coaxial cable extending out of the body; and
a twisted pair connector provided within the forward interior of the body at a twisted pair coupling location, the twisted pair connector being configured to electrically couple the twisted pair cable of the hybrid cable to an outgoing twisted pair cable extending out of the body.

12. A network interface device comprising:
a body including a base wall, a top wall, a bottom wall, a first side wall, and a second side wall defining a forward interior in which telecommunications components are arranged, the telecommunications components including an electrical cable adapter for electrically coupling two electrical cables, the bottom wall defining a first opening;

a fiber optic adapter mounted at the first opening in the bottom wall, the fiber optic adapter extending from a first end to a second end, the first end of the fiber optic adapter defining a first port for receiving a first fiber optic connector from inside the forward interior of the body, the second end of the fiber optic adapter defining a second port for receiving a second fiber optic connector from outside the body, the fiber optic adapter being configured to optically couple the first fiber optic connector to the second fiber optic connector;

a cover pivotally mounted to the body, the cover configured to pivot from a first position in which the cover closes the forward interior of the body to a second position in which the cover provides access to the forward interior of the body, the cover including a shroud extending over the second fiber optic connector to inhibit insertion and removal of the second fiber optic connector from the body; and a fiber spool mounted to a rear of the body, the fiber spool configured to receive and store excess length of a cable terminating at the second fiber optic connector.

13. The network interface device of claim 12, further comprising a shelf extending forwardly of the base wall within the forward interior, the shelf defining a slot or opening at which the electrical cable adapter can be mounted.

14. The network interface device of claim 12, further comprising a trough at which the electrical cable adapter can be mounted, the trough being defined in the base wall within the forward interior of the body.

* * * * *